United States Patent
Datta

(10) Patent No.: US 6,622,168 B1
(45) Date of Patent: Sep. 16, 2003

(54) DYNAMIC PAGE GENERATION ACCELERATION USING COMPONENT-LEVEL CACHING

(75) Inventor: Anindya Datta, Atlanta, GA (US)

(73) Assignee: Chutney Technologies, Inc., Atlanta, GA (US)

( * ) Notice: Subject to any disclaimer, the term of this patent is extended or adjusted under 35 U.S.C. 154(b) by 331 days.

(21) Appl. No.: 09/722,260

(22) Filed: Nov. 24, 2000

Related U.S. Application Data

(60) Provisional application No. 60/195,806, filed on Apr. 10, 2000.

(51) Int. Cl.[7] .......................... G06F 15/16; G06F 12/00
(52) U.S. Cl. .................. 709/219; 709/217; 709/202; 709/203; 711/137
(58) Field of Search .................. 709/202, 217–219; 711/137

(56) References Cited

U.S. PATENT DOCUMENTS

| | | | |
|---|---|---|---|
| 5,933,832 A | 8/1999 | Suzuoka et al. | 707/101 |
| 6,023,726 A | 2/2000 | Saksena | 709/219 |
| 6,026,413 A | 2/2000 | Challenger et al. | 707/202 |
| 6,055,572 A | 4/2000 | Saksena | 709/224 |
| 6,067,565 A | 5/2000 | Horvitz | 709/218 |
| 6,085,193 A | 7/2000 | Malkin et al. | 707/10 |
| 6,085,226 A | 7/2000 | Horvitz | 709/203 |
| 6,098,064 A * | 8/2000 | Pirolli et al. | 707/2 |
| 6,167,438 A | 12/2000 | Yates et al. | 709/216 |
| 6,178,461 B1 | 1/2001 | Chan et al. | 709/247 |
| 6,182,122 B1 | 1/2001 | Berstis | 709/217 |
| 6,182,133 B1 | 1/2001 | Horvitz | 709/223 |
| 6,191,782 B1 | 2/2001 | Mori et al. | 345/327 |
| 6,195,622 B1 | 2/2001 | Altschuler et al. | 703/2 |
| 6,216,212 B1 | 4/2001 | Challenger et al. | 711/163 |
| 6,219,676 B1 | 4/2001 | Reiner | 707/201 |

OTHER PUBLICATIONS

Sudhir G. Rao; Antonio Badia; Dirk Van Gucht: *Providing Better Support for a Class of Decision Support Queries*, 1996 SIGMOD–ACM; pp. 217–227 (Montreal, Canada).

Bennet Vance; David Maier; *Rapid Bushy Join–order Optimization with Cartesian Products*, 1996 SIGMOD–ACM; pp. 35–46 (Montreal, Canada).

Latha S. Colby, Timothy Griffin, Leonid Libkin, Inderpal Singh Mumick, Howard Trickey; *Algorithms for Deferred View Maintenance*, 1996 SIGMOD–ACM; pp. 469–480 (Montreal, Canada).

Piyush Goel, Bala Iyer, *SQL Query Optimization: Reordering for a General Class of Queries*, 1996 SIGMOD–ACM; pp. 47–56 (Montreal, Canada).

Venky Harinarayan, Anand Rajaraman, Jeffrey D. Ullman, *Implementing Data Cubes Efficiently*, 1996 SIGMOD–ACM; pp. 205–216 (Montreal, Canada).

(List continued on next page.)

Primary Examiner—David Wiley
Assistant Examiner—Joseph E Avellino
(74) Attorney, Agent, or Firm—Sutherland Asbill & Brennan LLP

(57) ABSTRACT

A preloader works in conjunction with a web/app server and optionally a profile server to cache web page content elements or components for faster on-demand and anticipatory dynamic web page delivery. The preloader uses a cache manager to manage requests for retrievals, insertions, and removal of web page components in a component cache. The preloader uses a cache replacement manager to manage the replacement of components in the cache. While the cache replacement manager may utilize any cache replacement policy, a particularly effective replacement policy utilizes predictive information to make replacement decisions. Such a policy uses a profile server, which predicts a user's next content request. The components that can be cached are identified by tagging them within the dynamic scripts that generate them. The preloader caches components that are likely to be accessed next, thus improving a web site's scalability.

10 Claims, 13 Drawing Sheets

OTHER PUBLICATIONS

Joseph M. Hellerstein, Jeffrey F. Naughton, *Query Execution Techniques for Caching Expensive Methods,* 1996 SIGMOD–ACM; pp. 423–434 (Montreal, Canada).

John T. Robinson, *The K–D–B Tree; A Search Structure for Large Multidimensional Dynamic Indexes,* 1981 ACM; pp. 10–18 (PA).

George P. Copeland, Setrag N. Khoshafian, *A Decomposition Storage Model,* 1985 ACM pp. 268–279 (Austin, Texas).

Ashish Gupta, Inderpal Singh Mumick, V.S. Subrahmanian; *Maintaining Views Incrementally,* 1993 SIGMOD–ACM, pp. 157–166 (Washington, D.C.).

Michael Freeston, *A General Solution of the n–dimensional B–tree Problem,* 1995 SIGMOD–ACM pp. 80–91 (San Jose, California).

Timothy Griffin, Leonid Libkin, *Incremental Maintenance of Views with Duplicates,* 1995 SIGMOD–ACM, pp. 328–339 (San Jose, California).

Yue Zhuge, Hector Garcia–Molina, Joachim Hammer, Jennifer Widom, *View Maintenance in a Warehousing Environment,* 1995 SIGMOD–ACM, pp. 316–327 (San Jose, California).

Ching–Tien Ho, Jehoshua Bruck, Rakesh Agrawal, *Partial–Sum Queries in OLAP Data Cubes Using Covering Codes,* 1997 PODS, pp. 228–238 (Tucson, Arizona).

Kjell Bratbergsengen, *Hashing Methods and Relational Algebra Operations,* 1984 Singapore, Proceedings of the 10th International Conference on Very Large Data Bases, pp. 323–333.

Patrick Valduriez, Setrag Khoshailan, George Copeland, *Implementation Techniques of Complex Objects,* 1986 Proceedings of the 12th, Kyoto International Conference on Very Large Data Bases, Austin Texas, pp. 101–110.

Masaru Kitsuregawa, Masaya Nakayama, Mikio Takagi, *The Effect of Bucket Size Tuning in the Dynamic Hybrid Grace Hash Join Method,* 1989 Proceedings of the 15th, Amsterdam International Conference on Very Large Data Bases, pp. 257–266.

Surajit Chaudhuri, Kyuseok Shim, *Including Group–By in Query Optimization,* 1994 Proceedings of the 20th VLDB Conference Santiago, Chile, pp. 354–366.

Ashish Gupta, Venky Harinarayan, Dallan Quass, *Aggregate–Query Processing in Data Warehousing Environments,* 1995 Proceedings of the 21st VLDB Conference (Zurich, Switzerland), pp. 358–369.

Weipeng P. Yan, Per Ake Larson, *Eager Aggregation and Lazy Aggregation,* 1995 Proceedings of the 21st VLDB Conference, Zurich, Switzerland, pp. 345–357.

Sameet Agarwal, Rakesh Agrawal, Prasad M. Deshpande, Ashish Gupta, Jeffrey F. Naughton, Raghu Ramakrishnan, Sunita Sarawagi, *On the Computation of Multidimensional Aggregates,* 1996 Proceedings of the 22nd VLDB Conference Mumbia (Bombay), India, pp. 506–521.

Damianos Chatziantoniou, Kenneth A. Ross, *Querying Multiple Features of Groups In Relational Databases,* 1996 Proceedings of the 22nd VLDB Conference, Mumbai (Bombay), India, pp. 295–306.

Curtis Dyreson, *Information Retrieval from an Incomplete Data Cube,* 1996 Proceedings of the 22nd VLDB Conference, Mumbai (Bombay), India, pp. 532–543.

Amit Shukla, Prasad M. Deshpande, Jeffrey F. Naughton, Karthikeyan Ramasamy, *Storage Estimation for Multidimensional Aggregates in the Presence of Hierarchies,* 1996 Proceedings of the 22nd VLDB Conference Mumbai (Bombay), India, pp. 522–531.

S. Sarawagi. Indexing OLAP data. *Bulletin of the IEEE Computer Society Technical Committee on Data Engineering,* pp. 1–9, 1996.

C.D. French. Teaching an OLTP database kernel advanced datawarehousing techniques. In Proc. 13th ICDE, pp. 194–198, Birmingham, UK, Apr. 7–11, 1997.

S. Khoshafian, G.P. Copeland, T. Jagodis, H. Boral, and P. Valduriez. A query processing strategy for the decomposed storage model. In Proc. ICDE, pp. 636–643, 1987.

P. O'Neil. Model 204 architecture and performance. In 2nd Intl. Workshop on High Performance Transaction Systems (HPTS), vol. 359 of Springer–Verlag Lecture Notes on Computer Science, pp. 40–59. Springer–Verlag, Asilomar, CA 1987.

P. O'Neil and G. Graefe. Multi–table joins through bit–mapped join indices. SIGMOD Record, 24(3):8–11, Sep. 1995.

J.H. Chu and G. Knott. An analysis of B–trees and their variants. Information Systems, 14(5), 1989.

B. Salzberg. Access Methods. ACM Computing Surveys, 28(1): 117–120, Mar. 1996.

S. Chauduri and U. Dayal. An overview of data warehousing and OLAP technology. SIGMOD Record, 26(1):65–74, Mar. 1997.

R. Armstrong. Data warehousing: Dealing with the growing pains. In Proc. Thirteenth Intl. Conf. on Data Engineering, pp. 199–205, Birmingham, UK, Apr. 7–11 1997. IEEE.

D. Comer. The ubiquitous B–tree. ACM Computing Surveys, 11(2):121–138, Jun. 1979.

M. Spiliopoulou, M. Hatzopoulos, and Y. Cotronis. Parallel optimization of large join queries with set operators and aggregates in a parallel environment supporting pipeline. IEEE TKDE, 8(3):429–45, Jun. 1996.

S.V. Vrbsky and J.W.S. Liu. APPROXIMATE—a query processor that produces monotonically improving approximate answers. IEEE Transactions on Knowledge and Data Engineering, 5(6):1056–1068, 1993.

A. Guttman, R–trees: a dynamic index structure for spatial searching. In M. Stonebraker, editor, Readings in Database Systems, pp. 599–609. Morgan Kaufmann Publishers, Inc., San Mateo, CA 1988.

E.F. Codd, S.B. Codd and C.T. Salley. Providing OLAP (on–line analitycal processing) to user–analysts: An IT mandate. Technical report, E.F. Codd & Associates, 1993.

Y. Zhao, P.M. Deshpande, and J.F. Naughton, An array––based algorithm for simultaneous multidimensional aggregates. In Proc. ACM SIGMOD Intl. Conf. on Management of Data, pp. 159–170, Tucson, AZ, May 13–15, 1997.

A. Shoshani. OLAP and statistical databases: Similarities and differences. ACM TODS, 22, 1997.

N. Roussopoulos, Y. Kotidis, and M. Roussopoulos. Cube–tree: Organization of and bulk updates on the data cube. In Proc. ACM SIGMOD Intl. Conf. on Management of Data, pp. 89–99, Tucson, AZ, May 13–15, 1997.

Oracle Corp. Star queries in Oracle8. White Paper, Jun. 1997.

D. Quass, Maintenance expressions for views with aggregations. In Proc. Workshop on Materialized Views: Techniques and Applications, Montreal, Canada, Jun. 7, 1996.

J. Nievergelt, H. Hinterberger, and K.C. Sevcik. The grid file: An adaptable, symmetric multikey file structure. In M. Stonebraker, editor, Readings in Database Systems, pp. 582–598. Morgan–Kaufmann Publishers, Inc., San Mateo, CA 1988.

A. Gupta, H. Jagadish, and I. Mumick. Data inegration using self–maintainable views. In Proc. Fifth Intl. Conf. on Extending Database Technology, Avignon, France, Mar. 1996.

S. Chaudhuri and K. Shim. Including group–by in query optimization. In Proc. 20th Intl. Conf. on Very Large Databases, pp. 131–139, Santiago, Chile, Sep. 1994.

Y. Kotidis and N. Roussopoulos. An alternative storage organization for rolap aggregate views based on cubetrees. In Proc. ACM SIGMOD Intl. Conf. on Management of Data, pp. 249–258, Seattle, WA, Jun. 1–4, 1998.

Red Brick Systems, Inc. Star Schema Processing for Complex Queries, White Paper, pp. 1–21.

Ming–Chuan Wu, Alejandro P. Buchmann; *Encoded Bitmap Indexing for Data Warehouses*, In Proc. 14th ICDE, pp. 220–230, Orlando, Florida, Feb. 1998.

H. Gupta, V. Harinarayan, A. Rajaraman, and J.D. Ullman. Index selection for OLAP. In Proc. Thirteenth *Intl. Conf. on Data Engineering*, pp. 208–219, Birmingham, UK, Apr. 7–11, 1997. IEEE.

C.Y. Chan and Y. Ioannidis. Bitmap index design and evaluation. In Proc. ACM SIGMOD *Intl. Conf. on Management of Data*, pp. 355–366, Seattle, WA, Jun. 1–4, 1998.

J.M. Hellerstein, P.J. Haas, and H.J. Wang. Online aggregation. In Proc. ACM SIGMOD *Intl. Conf. on Management of Data*, pp. 171–182, Tucson, AZ, May 13–15, 1997.

C.T. Ho, R. Agrawal, N. Meggido, and R. Srikant. Range queries in OLAP data cubes. In Proc. ACM SIGMOD *Intl. Conf. on Management of Data*, pp. 73–88, Tucson, AZ, May 13–15, 1997.

I.S. Mumick, D. Quass, and B.S. Mumick, Maintenance of data cubes and summary tables in a warehouse. In Proc. ACM SIGMOD *Intl. conf. on Management of Data*, pp. 100–111, Tucson, AZ, May 13–15, 1997.

P. O'Neil and D. Quass. Improved query performance with variant indexes. In Proc. ACM SIGMOD *Intl. Conf. on Management of Data*, pp. 38–49, Tucson, AZ, May 13–15, 1997.

D. Quass and J. Widom. On–line warehouse view maintanence. In Proc. ACM SIGMOD *Intl. Conf. on Management of Data*, pp. 393–404, Tuscon, AZ, May 13–15, 1997.

M.J. Carey and D. Kossman. On saying "enough already" in SQL. *In Proc. ACM SIGMOD Intl. Conf. on Management of Data*, pp. 219–230, Tucson, AZ, May 13–15, 1997.

B. Adelberg, H. Garcia–Molina, and J. Widom. The STRIP rule system for efficiently maintaining derived data. In Proc. ACM SIGMOD *Intl. Conf. on Management of Data*, pp. 147–158, Tucson, AZ, May 13–15, 1997.

\* cited by examiner

DYNAMIC PAGE GENERATION ACCELERATION USING COMPONENT-LEVEL CACHING

RELATED APPLICATIONS

The present application claims priority to a provisional application filed in the U.S. Patent and Trademark Office on Apr. 10, 2000 with Ser. No. 60/195,806. The contents of the provisional application are hereby incorporated by reference.

FIELD OF THE INVENTION

The present invention generally relates to delivering web pages over the Internet. More particularly, the present invention relates to caching web page components to enable improved web page delivery speeds and web site scalability.

BACKGROUND OF THE INVENTION

A critical issue in conducting commerce via the Internet ("e-commerce") is scalability. E-commerce has experienced phenomenal growth during the past few years, and is expected to continue this upward trend for years to come. Some predictions claim that e-commerce revenues will exceed $1.3 trillion by 2003. Along with this growth in revenue comes significant increases in web traffic. E-commerce web sites are having trouble supporting such extreme growth while maintaining acceptable qualities of service with the current state of Internet infrastructure technology.

As the number of Internet customers increases, e-commerce companies are required to deliver web pages to tens of thousands of customers simultaneously. This requirement can place a great strain on the computing resources of e-commerce companies. Moreover, most e-commerce companies are delivering dynamic web pages to customers, rather than static web pages. Dynamic web pages enable the delivery of tailored information to a customer, because the dynamic web page is created on-the-fly, in response to a set of parameters associated with a particular customer, such as information related to the customer's buying habits or Internet browsing behavior.

Many web sites currently utilize application servers to dynamically generate Hypertext Markup Language (HTML) pages. Application servers execute scripts in order to generate (or create) these dynamic web pages. These scripts typically do a significant amount of work to generate a dynamic web page. For example, the application server may retrieve web page content from database systems (located locally or remotely), content transformations may be required (e.g., from XML to HTML) (XML is an acronym for Extensible Markup Language), and other business logic may be executed (e.g., personalization logic). In the absence of web page caching, each request for a dynamic web page requires that the entire script be executed each time. When the same web page content is requested and generated repeatedly, this results in unnecessary load on the application server, and hence longer (and often unacceptable) response times for site visitors.

In order to reduce the overhead associated with dynamic page generation, pages (or portions of pages) may be cached in main memory. Caching requires that policies be established to govern the replacement of pages in the cache. Commonly used cache management policies are Least Recently Used (LRU) and Most Recently Used (MRU) cache policies, both of which have been used extensively in the operating systems context. However, these schemes are based purely on access history, and are often inappropriate in the context of the web.

Today, many sites delivering dynamic web pages experience serious performance problems in terms of response times (i.e., the time to deliver a complete web page to a customer). For example, a recent study reports that the average page download time for the most popular auction sites is 6.30 seconds. Poor performance can be extremely detrimental to a web site's ability to, successfully conduct commerce online.

Another study predicts that if a web page requires longer than eight seconds to deliver to a customer, then 30% of customers will abandon the web page request. Unacceptable web page delivery delays are a known cause for customer abandonment (i.e., customer attrition). It has been estimated that a one second improvement in page loading time (i.e., from 6.30 seconds to 5.30 seconds) can reduce the abandonment rate from 30 percent to about 7 percent. Another study indicates that customer attrition attributable to abandonment may cost the online business community upwards of $100 million per month.

To solve the attrition problem, many e-commerce providers are increasingly adopting dynamic page generation technologies to dynamically display content due to the significant flexibility it awards the designer in delivering custom content to users. However, dynamic page generation, while flexible, comes with a cost. As explained previously, web and application server ("web/app server") scalability is significantly reduced because pages are now generated "on demand", which places additional load on the web/app servers in order to retrieve and format the requested content. Consequently, even under moderate traffic loads, page generation times slow down significantly.

One use of dynamic web page generation involves the promotion of related products. For example, a visitor at an online book web site may travel down the web page link path: Fiction-Thriller-Legal Thriller. If it is known (e.g., through accumulating empirical Internet browsing behavior data) that customers who travel down this linkpath are statistically likely to also be interested in fusion jazz—this type of knowledge is actually widely accumulated these days—then the next web page presented to the customer might have a component including a reference to fusion jazz.

One solution, the eGlue Server, manufactured and marketed by Chutney Technologies, Inc. of Atlanta, Ga., is designed to quickly establish relationships between a customer's browsing behavior and previously accumulated empirical behavior data, so that such statistical knowledge can be utilized for various purposes, such as tailoring a web site to a customer's tastes or determining which items in a cache to replace. The eGlue Server (also called a profile server) is designed to provide such predictive knowledge to requesting applications. Given this context, the eGlue Server, immediately upon the detection of the Legal Thriller click by the visitor, would recommend that the page delivered to the user contain an e-coupon from Tower Records with a discount in the fusion jazz category. Note that while the above example is in the context of delivering advertisements and promotions, the same functionality could be used in the context of caching Web content. In particular, the predictive knowledge could be used in the cache replacement policy for Web content that is cached.

Given the extreme growth in Internet traffic as well as the increasing use of dynamic page generation technologies, there is a need in the art to improve web and application server scalability. Scalability can be improved by caching components of dynamic web pages. Further improvements in performance may be obtained by utilizing predictive information in the cache replacement policy.

SUMMARY OF THE INVENTION

The present invention solves the above-identified problems by providing a preloader that works in conjunction with a web/app server and optionally a profile server to cache web page content elements or components for faster on-demand and anticipatory dynamic web page delivery. The preloader uses a cache manager to manage requests for retrievals, insertions, and removal of web page components in a component cache. The preloader uses a cache replacement manager to manage the replacement of components in the cache. The cache replacement manager may utilize any cache replacement policy. However, a particularly effective replacement policy utilizes predictive information to make replacement decisions. Such a policy uses a profile server, which proves a means of predicting a user's next content request. The components that can be cached are identified by tagging them within the dynamic scripts that generate them. The Preloader caches components that are likely to be accessed next, thus improving a web site's scalability.

In one aspect of the present invention, a web page delivery system is provided for dynamically generating a web page having at least one content element. The web page delivery system has a web/app server that receives a web page request from a user, generates a web page, and delivers the web page to the user . The web page delivery system also has a preloader that receives content element retrieval requests from the web/app server and delivers content elements to the web/app server, in response to receiving the content element retrieval requests. The web page delivery system also has a profile server that receives hint requests from the preloader and delivers hints to the preloader. The preloader has a component cache and maintains the content elements in the component cache and delivers the content elements to the web server, in response to a determination that the hint indicates that the content elements will be needed by the web/app server to generate the web page.

In another aspect of the present invention, a method is provided for delivering a web page. A web page request is received where the web page request corresponds to a web page having at least one content element. It is determined whether a tagged content element resides in a component cache, where the tagged content element corresponds to the requested content element. A content response is generated for each content element request, wherein the content response includes the tagged content element if the tagged content element resides in the component cache. The requested content element is generated if the tagged content element does not reside in the component cache. A content element node is stored in the component cache, in response to a determination that the tagged content element does not reside in the component cache. The content element node corresponds to the generated content element. The web page is delivered with the respected content element(s).

In yet another aspect of the present invention, a method is provided for caching a content element. A content element retrieval request is received that corresponds to the content element. A retrieval response is sent, in response to the content element retrieval request. The retrieval response indicates whether the content element resides in a component cache. A content element insertion request is received that corresponds to the content element. An insertion response is sent, in response to the content element insertion request. The insertion response indicates whether the content element was successfully inserted into the component cache. A determination is made as to whether the content element should reside in the component cache. The content element is removed from the component cache, in response to a determination that the content element should not reside in the component cache. The content element is associated with a content element node and is stored in the component cache, in response to a determination that the content element should reside in the component cache.

In still another aspect of the invention, a component cache data structure is provided for storing a current content element. A content element node is associated with the current content element. The content element node comprises at least a NodeID data field, a NavProb data field, a NextNode data field, a Timestamp data field, and a Content data field. The NodeID data field comprises a PageID and a Code Block ID and uniquely identifies the current content element. The NavProb data field comprises a conditional probability that the current content element will be needed to generate a web page. The Timestamp data field comprises a time that the current content element was last accessed. The Content data field contains a representation of the current content element. The NextNode data field comprises an array structure containing at least one destination NodeID representing a destination content element that is reachable from the current content element.

The various aspects of the present invention may be more clearly understood and appreciated from a review of the following detailed description of the disclosed embodiments and by reference to the drawings and claims.

DETAILED DESCRIPTION

An exemplary embodiment of the present invention improves web page delivery speed and web site scalability by prefetching and caching dynamic web page content. In one embodiment, the present invention can be implemented in cooperation with a profile server, such as the eGlue server, manufactured and marketed by Chutney Technologies, Inc. of Atlanta, Ga. The profile server is based on Real-time Interaction Management (RIM) architecture that is designed to enable organizations to build and deploy electronic commerce (e-commerce) solutions that provide the user with a personalized shopping experience by tracking historical consumer behavior and reacting accordingly. The RIM architecture enables real-time querying of vast amounts of historical data to allow e-commerce businesses to anticipate customer needs and to provide content that is tailored for the customer thereby enhancing the customer's online experience. A more detailed description of the profile server is provided in a co-pending application, Ser. No. 09/588,257, assigned to Chutney Technologies, Inc. A more detailed description of the real-time querying enabled by the RIM architecture is provided in a co-pending application, Ser. No. 09/428,838, also assigned to Chutney Technologies, Inc. Both of these patent applications are hereby incorporated by reference.

The Scalability Problem

Web page delivery performance is a critical success factor for e-commerce. The performance of a web site is determined by its ability to scale. Not only must a site be able to provide fast response times (i.e., web page delivery speed), but also it must be able to do so even under heavy user loads (i.e., high user traffic). Scalability refers to the ability of a web site to deliver web pages in a timely manner in high traffic situations and the ability of the web site to respond appropriately when traffic significantly increases. Thus, scalability is a critical problem for e-commerce sites. An exemplary embodiment of the present invention defines a novel and unique dynamic web page component caching model that improves the scalability of web and application servers.

Figure 1:
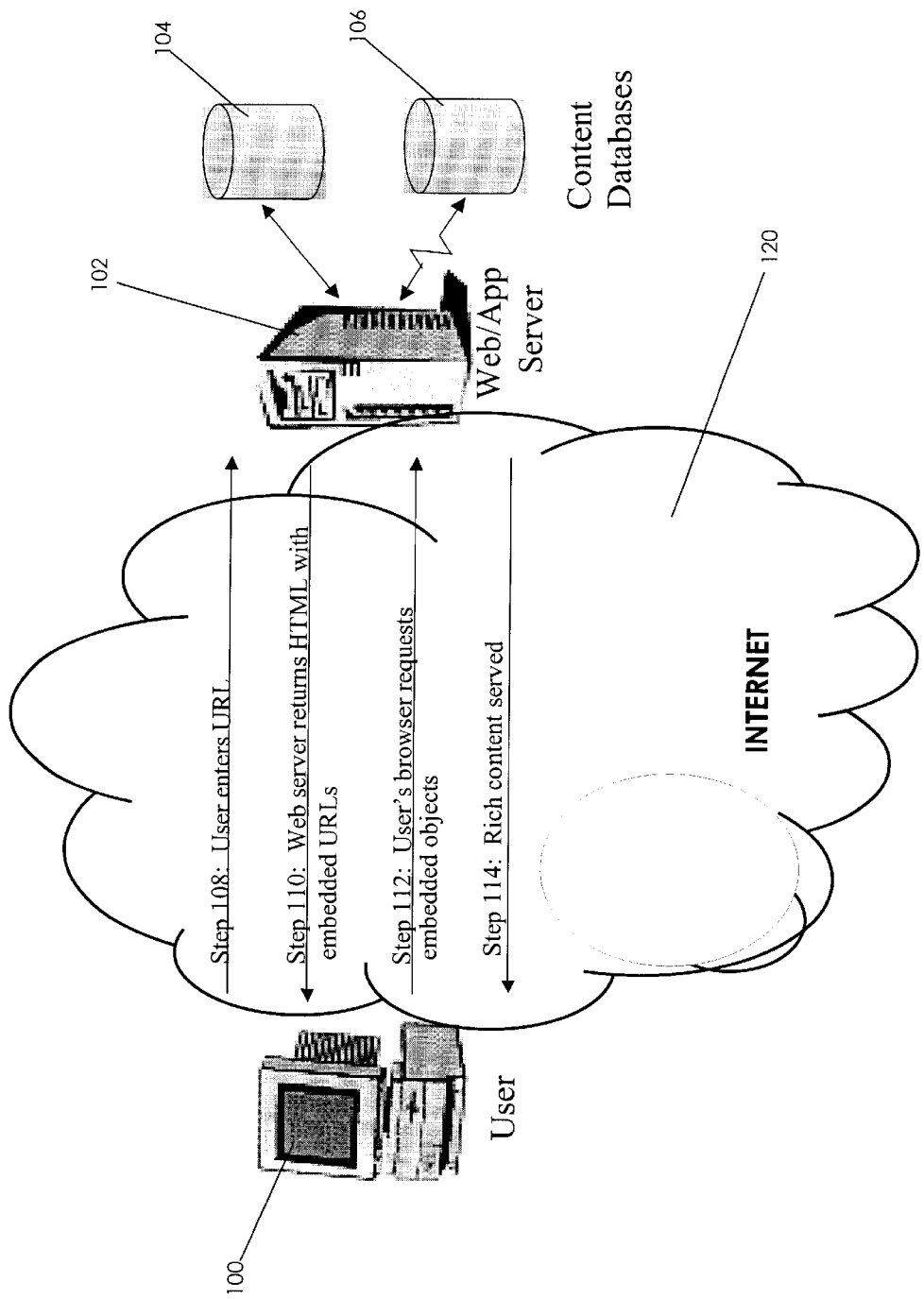
FIG. 1 depicts the conventional steps required to satisfy a web page request for delivery of a web page from a web server.

FIG. 1 depicts the conventional steps required to satisfy a user's request for a web page over the Internet. As FIG. 1 shows, the exemplary web page download is a four-step process. A web page typically consists of text and several embedded objects, often graphics. A web page can be thought of as a set of components (or content elements), where a component is a group of data that is displayed together. A user typically uses a local computer 100 to connect to a web server and/or an application server web/app server 102 via the Internet 120. Web and application servers are typically different entities, but they are collectively referred to as web/app servers here for the sake of simplicity. The web/app server 102 is connected to content databases 104, 106 either directly or via the Internet 120 (or some other network). The content databases 104, 106 contain content elements that can be accessed by the user 100 by making a content request in the form of a web page request to the web/app server 102.

When a user 100 first requests a web page via an Internet browser, the user's browser enters the URL for the location of the script that will generate the requested page (Step 108). The web/app server 102 then executes the script, which generates the content (e.g., HTML) corresponding to the requested page, along with the URLs for the embedded objects in the page. This step involves additional work on the part of the web/app server 102 in order to retrieve and format the requested content. For example, content is typically retrieved from underlying database systems, such as content databases 104, 106 which may be located remotely. Once the content is retrieved, additional steps may be required to format the content (e.g., content stored as XML must be rendered as HTML). In short, the web/app server 102, upon receipt of the user's request, performs significant work and outputs the HTML (with embedded objects) that is sent back to the user (Step 110).

After the user 100 receives the server output (Step 110), subsequent requests are made by the user's browser for the embedded objects (Step 112) (browsers differ in the number of objects they can retrieve per request). These objects are often located on the web/app server 102 (though this is not always the case). The web/app server 102 returns the objects to the user over the Internet (Step 114). This last step can be quite bandwidth intensive. Pages having a large number of embedded objects can have significantly longer download times. Moreover, the traffic between the client and server must go through an extensive network of transmission and switching devices such as routers, switches, and firewalls. Thus, the communication between the user 100, the web/app server 102, and any involved content databases 104, 106 can be extremely consumptive of time and computing resources.

Given the above-identified steps involved in downloading a web page, a number of potential bottlenecks can be identified. These bottlenecks can be classified into four broad areas:

1. low bandwidth at the user and/or web/app server ends,
2. page generation latency,
3. fetching embedded objects, and
4. redundant connections to serve the same objects.

Each of these types of delay is next described in more detail.

Delays due to low bandwidth concern network speeds. Since the Internet backbone is high-speed, bandwidth problems occur primarily at the user and/or web server ends. In the past, modem speeds have limited the ability to achieve fast Internet access speeds and thus have contributed to slow download times. More recently, however, the advent of higher bandwidth access technology, such as broadband modems, has significantly improved this problem. For this reason, the bandwidth problem is becoming less of an issue.

Delays associated with page generation latency are caused by the work that is required by the web/app server 102 to deliver the requested content. This type of delay occurs between Steps 108 and 110 in FIG. 1. The page generation latency component was not considered to be a significant problem until very recently, because the traditional response of the web server 102 was to transmit a static HTML page to the user 100. With the increasingly widespread use of dynamic page generation technologies, this problem has become a critical issue, because so much more work is required of the web/app server. Page generation latency delays include the delays due to retrieving content from persistent file systems such as content database systems 104, 106 (both local and remote), the delays due to the web/app server's 102 formatting the content elements, and the delays due to business logic execution (e.g., personalization logic).

Fetching embedded objects (Step 112) incurs additional network delay. Typically, a user 100 and a web/app server 102 are separated by long distances, and embedded objects that are requested must be downloaded over these long distances. This causes a delay, because these large pieces of data move relatively slowly, given the switching that is required to make a connection over a significant distance. Solutions to this problem are available and generally involve an attempt to ameliorate these delays by locating data (e.g., embedded objects) closer to end users (i.e., storing rich content objects on servers that are located close to end users). Thus, this approach reduces the travel distance required for content delivery and decreases the number of hops from content provider to end user.

The problem of redundant connections concerns page requests generally. Each page request typically must go through a router, firewall, and switch before reaching the web server 102, where it is processed and then passed back through the same network components. Forcing each request through these devices, each having finite throughput, can easily expose scalability problems. Furthermore, as more and more users try to access the same content, the redundant load on the firewalls and servers for the same objects increases dramatically. While sites are increasingly using dynamic page generation technologies to generate content on demand, there are still a large number of objects on a given web page that are static. In fact, it is estimated that as much as 90% of web objects can be static. Solutions to this problem are available and generally involve attempting to reduce the number of redundant connections for such objects by caching these objects and thereby reducing the load on the origin servers. However, this problem will become less of an issue over time as embedded objects are increasingly becoming dynamic (e.g., Java applets).

The four broad areas described above have received varying degrees of attention. As mentioned previously, the bandwidth problem has received significant attention and is therefore not expected to be an issue in the future. The latter two problems, fetching embedded objects and redundant connections, have also received significant attention recently, and a number of viable solutions exist on the market. Furthermore, these two problems concern latency on the network. In the long term, it is unclear whether network latency will remain an issue given the impending arrival of terabit (TB) network bandwidths. The problem of page generation latency is one that has not yet been adequately addressed. The present invention provides a novel solution to this problem.

The Page Generation Latency Problem

The problem of page generation latency concerns the delays associated with generating pages at the web/app server 102. This problem, while significant, has been largely overlooked. In addition to pure script execution overhead, which itself can be non-trivial under moderate to heavy traffic load, there are several other types of delay associated with generating dynamic pages. These types of delay are next described in more detail.

One kind of page generation delay is caused by fetching content from persistent storage. This kind of delay is attributable tot he need to retrieve data stored on a disk, a notoriously slow operation. This delay can be further classified according to the two types of access required: a) local database access, and b) remote database access. Both types of access to database systems incur input/output (I/O) delay. Access to remote database systems is even more costly as it incurs network delay in addition to I/O delay.

Another kind of page generation delay is caused by the need to perform data transformations. Given the overwhelming acceptance of XML as a medium of exchange and as a means of describing content, Web sites are increasingly maintaining content in XML format. However, since XML alone cannot be presented in a meaningful way, there is a need to separate the content and presentation aspects of a web page. This separation is made possible by the use of XSLT (Extensible Stylesheet Language Transformations), a language used to transform an XML document into some other specified format (e.g., HTML text). A number of vendors offer XSLT processors which perform such transformations. This XML to HTML transformation process increases the load on the server, since it involves parsing and other string-processing operations.

Yet another kind of page generation delay is caused by the need to execute business logic. It is common for web sites to incorporate business logic into their scripts. For example, many e-commerce sites utilize personalization software to deliver targeted content to site visitors, which further increases the load on web/app servers as well as on the underlying databases.

Figure 2:
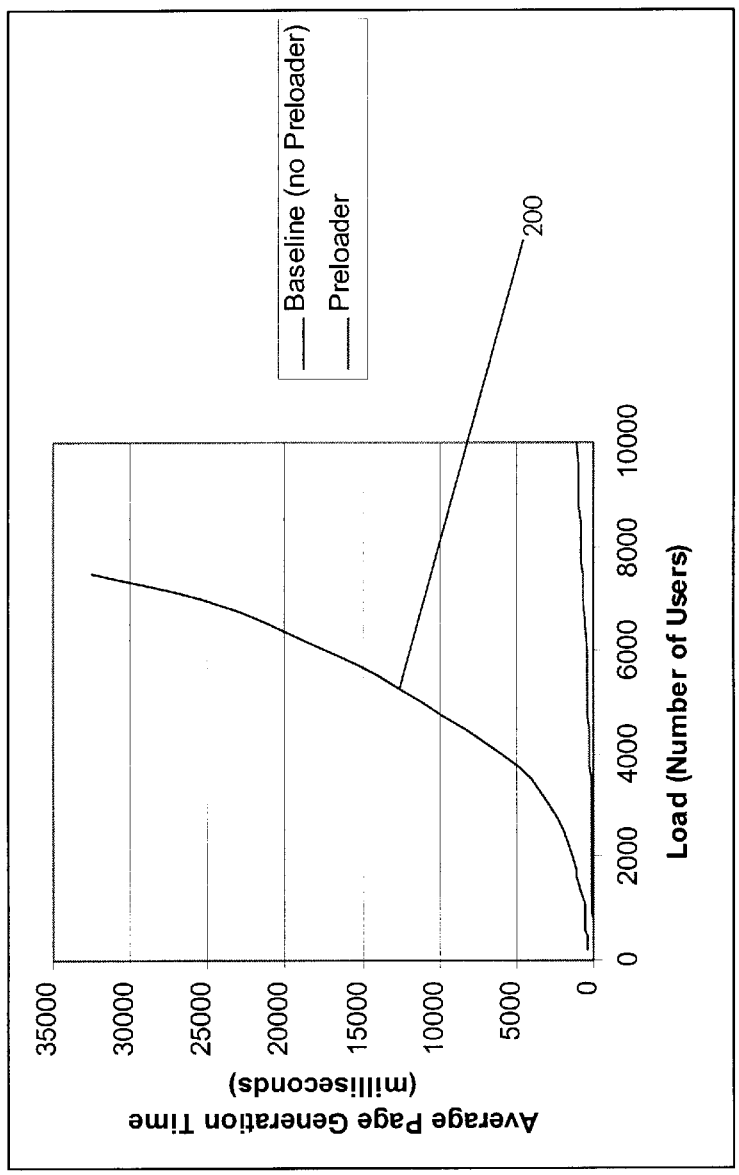
FIG. 2 depicts a graph of the performance of a conventional catalog-based web site that dynamically generates catalog pages.

Web page generation latency is a substantial problem and in many cases is the primary impediment to efficient web page generation and delivery. FIG. 2 depicts a graph of the performance of a conventional catalog-based web site that dynamically generates catalog pages. The performance curve 200 plots the average page generation time for a given number of users accessing the web site. For this web site, the only relevant component of page generation latency is the I/O delay, as there are no remote resources involved and no transformations are taking place. Thus the performance curve 200 depicted provides the lower bounds for page generation latency delay. The web site used to obtain the results depicted in FIG. 2 is a relatively simplistic web site in that it does no additional processing beyond displaying catalog pages. Many e-commerce sites are also incorporating technologies to deliver targeted content (such as personalization software), which further increases the load on web/app servers as well as the underlying content databases. For sites utilizing both dynamic scripts as well as content targeting technologies, scalability issues are even more of a concern.

As depicted by the performance curve 200 in FIG. 2, for relatively small user loads (less than 1000 simultaneous users), the average time required to generate a page is reasonable: roughly around 500 milliseconds. However, when the load increases beyond 1000 users (still a moderate load by today's e-commerce standards), there is a dramatic spike in the page generation time. This spike is due to the inability of the underlying database system to keep up with the incoming requests.

There are currently no solutions available on the market that explicitly address these dynamic page generation processing delays. While some caching may be done by a database management system (DBMS) (especially with the advent of main memory database systems) or the web/app server, this caching does not mitigate the problem of accessing remote databases, nor does it address the problem of data transformations. The existing scaling solutions do not impact server latency at all. Moreover, given that I/O times have reduced by a factor of only 2.5 times during the last decade (as opposed to network latencies, which have reduced by a factor of $10_6$), the problem of I/O delay is a legitimate concern. The problem itself is new, and is a result of the introduction and rapid deployment of dynamic page generation technologies. In many cases, page generation bottlenecks become the dominant impediment to efficient dynamic web page generation, and thus to the overall scalability of the site. While the conventional approach is to buy more hardware and software, this is clearly not an attractive alternative in terms of cost, and is often an infeasible solution in the long run.

To solve this problem, an exemplary embodiment of the present invention provides a server-side caching engine that caches dynamic web page elements (content elements or components), thereby significantly reducing the page generation load on the web/app server. One embodiment of the present invention provides a Preloader that is a server-side caching model for caching page elements in cooperation with commonly used dynamic page generation technologies. The Preloader model can be implemented as a 'software solution or as a stand-alone appliance. An exemplary embodiment of the present invention capitalizes on the above-referenced profile server technology to improve web page delivery speed and web site scalability by prefetching and caching web page components. A brief description of the operation of an exemplary profile server is, therefore, beneficial to providing a complete description of the present invention.

An Exemplary Profile Server

Figure 3:
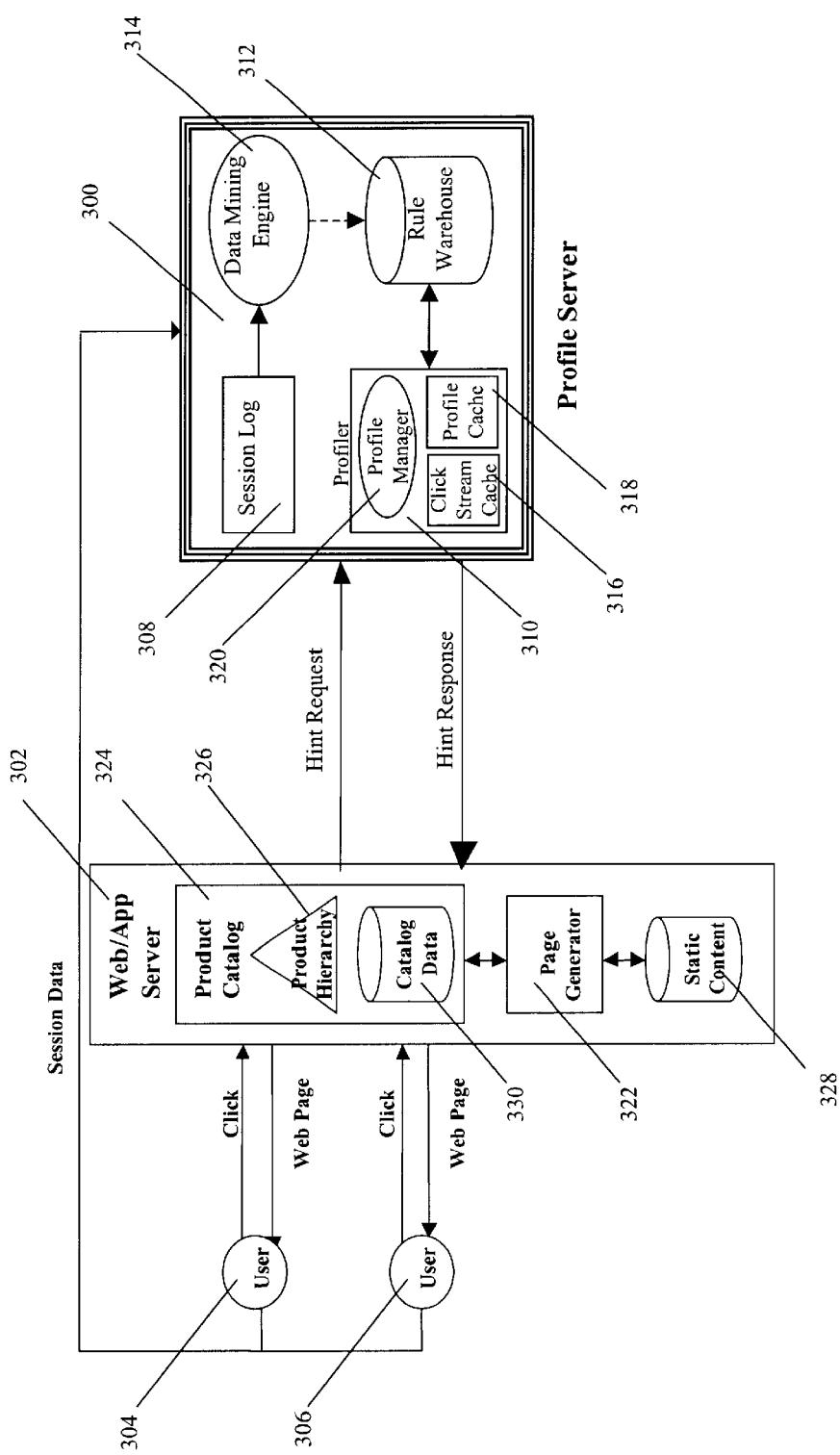
FIG. 3 is a block diagram depicting an exemplary profile server in the context of an exemplary web server that generates dynamic web pages.

FIG. 3 is a block diagram depicting an exemplary profile server 300 in the context of an exemplary e-commerce web site's web/app server 302 that generates dynamic web pages to a user 304, 306. The profile server 300 has a session log 308, a Profiler 310, a Rule Warehouse 312, and a Data Mining Engine 314.

An exemplary Profiler 310 consists of three components: (1) a Clickstream Cache 316, which stores current clickstream information (of maximum clickstream length CSL) for each user 304, 306 in the system, (2) a Profile Cache 318, which stores recently-used profiles, and (3) a Profile Manager 320, which generates hints for the web/app server 302, in response to a hint request from the web/app server. A clickstream is simply a series of recorded user actions (e.g., clicks on web page hyperlinks) in the sequence in which the user took the actions.

To illustrate the mechanics of the hint generation process, it is helpful to consider the example of a user visiting a web site that employs the profile server 300. Consider a situation where the web/app server 302 has submitted a hint request to the profile server 300 for the user's $i^{-th}$ click. The Profile Manager 320 first checks the Clickstream Cache 316 to find the. user's previous clickstream (if any), and any updates that include the user's latest reported action.

After determining the user's current clickstream, the Profile Manager 320 checks the Profile Cache 318 for a profile matching the user's clickstream. If such a profile is found, the Profile Manager 320 generates a hint from it, and sends the hint to the web/app server 302. If, at this point, another user were to follow the same path as the first user, then the needed profile would be in the Profile Cache 318 (assuming the second user visits the web site soon enough after the first user that the profile has not been replaced by a newer profile).

If a matching profile is not found in the Profile Cache 318, the Profile Manager 320 requests the information from the Rule Warehouse 312. The operation of the Rule Warehouse 312 is described in more detail below. After the Rule Warehouse 312 returns the profile information, the Profile Manager 320 generates a hint, and sends it to the web/app server 302. This profile will also now reside in the Profile Cache 318 until a decision is made to discard it.

The Rule Warehouse 312 is a data warehouse engine that is an extremely fast storage and retrieval engine. The Rule Warehouse 312 is described in more detail in a co-pending patent application, Ser. No. 09/428,838, also assigned to Chutney Technologies, Inc. This patent application is hereby incorporated by reference. In the context of the profile server 300, the Rule Warehouse 312 stores historical and navigational data in the form of rules, and retrieves this data in response to queries.

The rules stored in Rule Warehouse 312 are generated by a conventional data mining engine which takes a clickstream (e.g., stored in the Session Log 308) and transaction information generated by various users clicking in the web site, as input, and generates a set of rules as output. Clickstream and transaction data is added to the Session Log 308 in an online fashion (i.e., for each user request), while the mining of the Session Log 308 and update of the Rule Warehouse 312 takes place offline (i.e., periodically, such as daily).

The rules used in profile server 300 are action rules and take the form:

$$\text{Action}_1-\text{Node}_1, \text{Action}_2-\text{Node}_2, \ldots \text{Action}_{CSL}-\text{Node}_{CSL} \rightarrow \text{Action}_R-\text{Node}_R; \text{probability (p)}$$

wherein $\text{Action}_j-\text{Node}_j$ can be a navigation click, a purchase click, or a departure click associated with Node j. Those skilled in the art will appreciate that any other action could also be accommodated. The antecedents of the rules are of a predetermined and configurable maximum length CSL, and correspond to a certain minimum confidence threshold and a minimum support threshold. The hints that are returned by the Profiler are in the form of a dynamic profile.

A dynamic profile, is a 2-tuple (RA, RC) of information where RA is a rule antecedent (i.e., a user clickstream of length CSL) and RC is a set $\{c_1, c_2, \ldots, c_n\}$ of rule consequents $c_i$, where each $c_i$, is itself a 3-tuple (A,L,p) where: A is an action; L is a node label; and p is the conditional probability of the consequent, given the antecedent.

Rules in the Rule Warehouse 312 are periodically updated to incorporate recent behavior. Note that generating and maintaining rules is an offline process and is an important feature of the profile server 300. However, this feature is not native to the profile server 300 itself, but rather is handled by a conventional data mining engine, which is incorporated as part of the overall solution.

The best way to describe the overall workings of the profile server system is to consider an example. Consider a user who clicks in a profile server 300 enabled e-commerce web site. This causes a Hypertext Transfer Protocol (HTTP) request to be sent to the web server. Those skilled in the art will appreciate that although the e-commerce and web servers are conventionally separate components, they can also be implemented as a single component. When the web server 302 receives an HTTP request from the user, it forwards the user's click information to the profile server 302 in the form of a Hint Request.

Upon receiving the user's click information, the profile server 302 performs two tasks. First, the profile server 302 updates the user's clickstream. Second, the profile server 302 generates a hint. A hint is simply a set of action-node-probability tuples, which represent actions that the user is likely to take on a particular node, together with the corresponding probability that the user will choose the action-node, given his current clickstream.

When the web/app server receives a hint from the profile server 302, it uses the hint to generate a customized web page for the user. Typically, the web server 302 runs a set of scripts that describe how a dynamic web page should be generated in different situations. In a profile server system, these scripts include business logic to handle profile server hints. Profile server hints may also be used to pre-generate and cache pages or components of pages. The pre-generation and caching of web pages and/or web page content elements is performed in conjunction with a Preloader module, which we will describe in more detail in connection with FIGS. 4–11.

The use of these hints is best described by considering an example in the context of the Preloader. Consider a situation where a user has navigated through a particular sequence of product catalog nodes. Further assume that, on the user's $i^{th}$ click, the profile server 300 returns a hint to the web/app server 302, suggesting that the user is highly likely to navigate to a particular node N on the user's next click (i.e., action/consequent), given his current clickstream (i.e., antecedent). Based on this information, the web server can proactively cache the content of node N, so that N is available in cache when the user clicks. If the user, in fact, requests access to node N, then the content of node N will be more quickly available to the user, because it has been cached and need not be retrieved.

In addition to the real-time server-side interaction with the profile server 300, each user click causes a Clickstream Monitor to send user session (i.e., click) information to the profile server 300, where it is stored in the Session Log 308 for later use in updating the Rule Warehouse. The Clickstream Monitor module can be a client-side Java applet that sends clicks (including client-side cache hits) to a server or a server-side logging mechanism. In this arrangement, client-side logging provides a more complete record of user behavior than server-side logging, but requires that the user's browser be Java-enabled. Since the information stored in the Session Log 308 is used for refreshing the Rule Warehouse (an offline operation), there is no requirement for this interaction to occur in real time.

The profile server 300 works in conjunction with conventional web servers 302 and e-commerce application servers to provide the functionalities we have described. The profile server 300 provides hints to the Page Generator 322, which then generates a page for each user click. The Page Generator 322 then synthesizes web pages by integrating content from various sources and formatting the content as necessary (e.g., into HTML pages). Web page content is drawn from various sources, including the Product Catalog 324 having a product hierarchy 326 (which stores product information in hierarchical format as well as detailed information about each product) and catalog data module 330. Web page content can also be drawn from a store of static content 328 (i.e., content not associated with a particular product catalog node, such as a corporate logo), and a server cache (not shown). Communication between the profile server and web server follows a client-server paradigm, wherein the web server requests hints from the profile server 302, and the profile server 302 provides hints in response.

Figure 4:
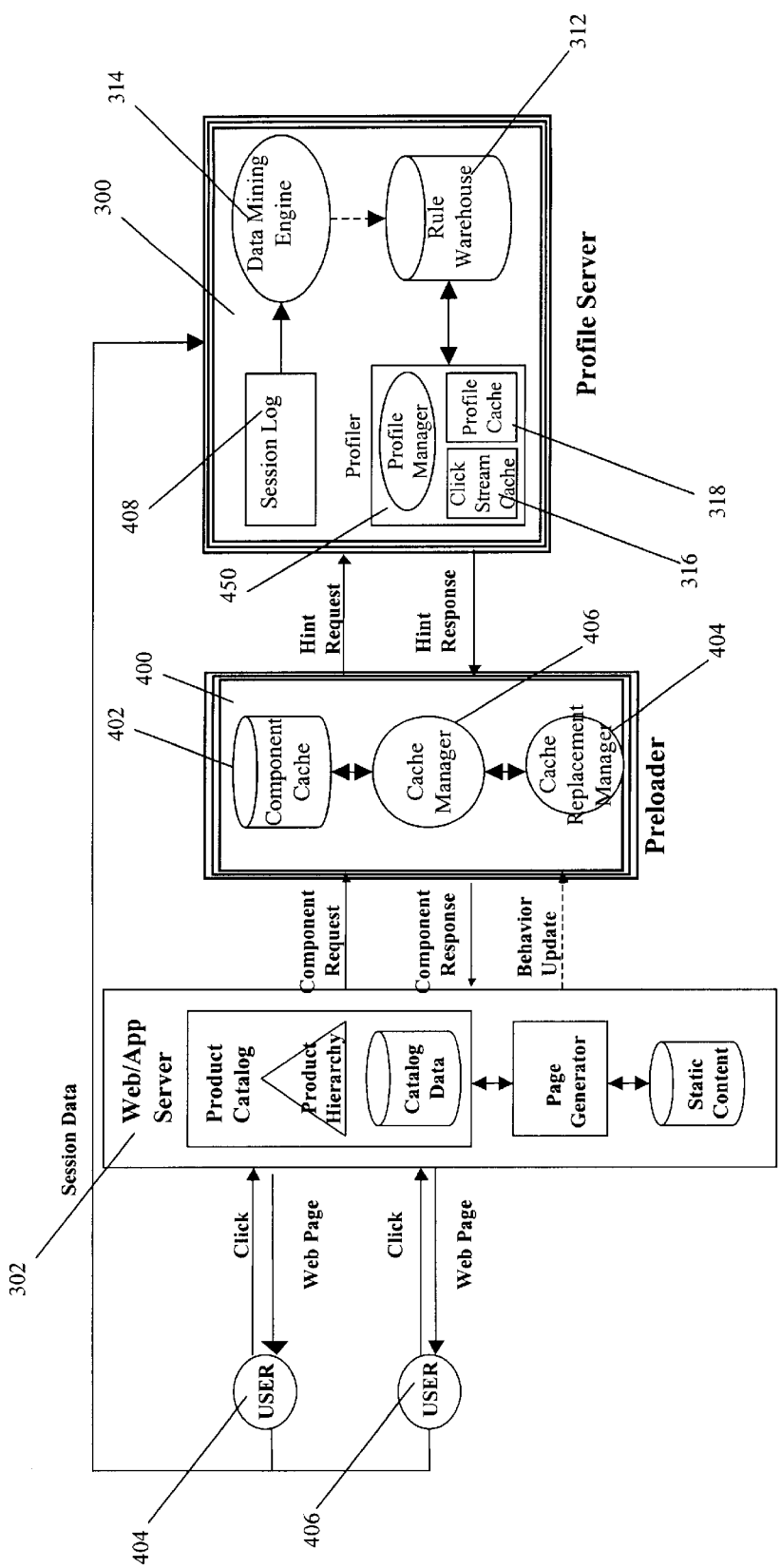
FIG. 4 depicts a preloader that is an exemplary embodiment of the present invention.

FIG. 4 depicts a Preloader 400 that is an exemplary embodiment of the present invention. The Preloader 400 works in conjunction with the profile server 300 to manage the profile server Preloader Component Cache. The Preloader 400 obtains predictive information from profile server 300 which is used to determine which content elements to maintain in the Preloader Component Cache and which to discard. Consider the example of a user who visits a favorite online bookseller. Assume that the user enters the site at the web site's home page, then navigates the following path: Fictions→Thriller→Legal→Thriller. The Preloader-enabled web .site can maintain detailed behavioral data about visitors to the site, so the web site is able to recognize that users who navigate the Fiction→Thriller→Legal Thriller path most often visit the John Grisham link next. With the Preloader application installed, the web site can cache content elements associated with the John Grisham link so that it is immediately available when a user requests it. This type of content element caching can have far-reaching effects in terms of scalability of the site, given that there may be tens of thousands of simultaneous users at the site. The following discussion provides a detailed description of the structure and operation of the Preloader in conjunction with a profile server and a web/app server.

An Exemplary Preloader Architecture

Figure 5:
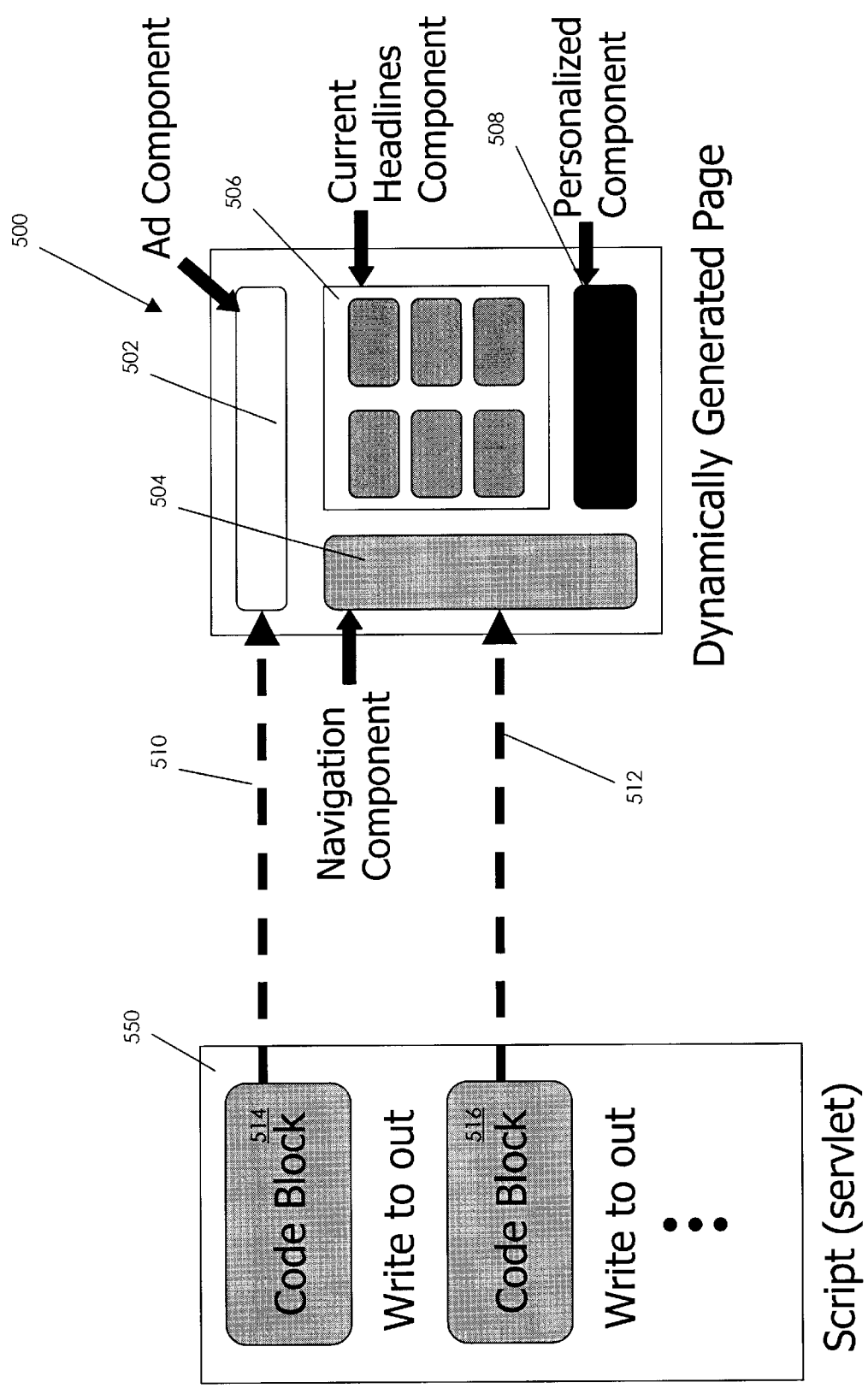
FIG. 5 is a block diagram of an exemplary dynamic web page and a script that is used for generating the dynamic web page.

To explain the Preloader architecture and concept first requires an understanding of how dynamic scripting works. Examples of dynamic scripting languages include Java Servlets, Java Server Pages (JSP), Active Server Pages (ASP), Perl, and CGI. A dynamic script typically consists of a number of code blocks, where each code block performs some work that is required to generate the page (e.g., retrieving or formatting content) Typically, a dynamic script produces an HTML fragment as output. While a fragment can be in any format,it is assumed for this discussion that the format is HTML. A WRITE TO OUT statement, which can follow each code block, can be used to place the resulting HTML fragment in a buffer. When a dynamic script runs, each code block is executed and the resulting HTML fragment placed in the buffer. Once all code blocks have executed, the entire HTML page is sent as a stream to the user. FIG. 5 depicts a high-level block diagram of an exemplary dynamic scripting process. The buffer is not shown in FIG. 5 for the sake of simplicity. The resulting dynamic web page that is generated by the scripting process thus consists of a set of fragments or components. For the purposes of describing an exemplary embodiment of the present invention, the terms content element, content, component, and fragment are all used to refer to a collection of data that is displayed together on a web page.

A dynamic web page can be thought of as a set of such content elements. For example, consider a dynamically generated web page 500 in a news site, as shown in FIG. 5. At the top of the web page is an Ad Component 502, where a banner ad is displayed. On the left side of the web page is a Navigation Component 504, which contains a navigation bar. In the center of the web page 500 is a Current Headlines Component 506, which contains links and descriptions of the current top stories. Finally, at the bottom of the page is a Personalized Component 508, which contains items that are of particular interest to an individual user (e.g., news items related to user-specified preferences), based on some predetermined indication of the user's preferences.

A significant advantage provided by this dynamic web page is the potential for re-use of the content. For example, for each user that requests this page, the Current Headlines 506 and Navigation Components 504 that are displayed will likely be identical. Thus, these components are especially conducive to caching. At the other extreme, the Personalized Component 508 may be unique for each request, and is thus less conducive to caching. In some situations, a component is not cacheable. For example, a component that displays the current time is not cacheable. Thus, from the perspective of the Component Cache 402 (FIG. 4), there are two types of content elements: cacheable and non-cacheable content elements. Non-cacheable content elements are those that may change between each web page generation, and hence should not be cached. All other content elements are considered to be cacheable.

As indicated by the dashed lines 510, 512 in FIG. 5, each code block 514, 516 corresponds to a component of the dynamic web page 500. The Preloader solution requires that cacheable components be identified. This decision is made by the web site designer. For each component that is deemed cacheable, the corresponding code block 514, 516 in the script 550 must be tagged or marked as cacheable. A tag is an identifier that marks a code block within a script as cacheable. When the script 550 is executed, the tags instruct the web/app server to first check the Component Cache 402 (FIG. 4) before executing the code block. If the requested fragment is found in the Component Cache 402, then it is returned directly from the cache and the code block logic is bypassed. If the requested fragment is not found in the Component Cache 402, then the code block is executed and the requested fragment is generated and subsequently placed in the cache.

Figure 6:
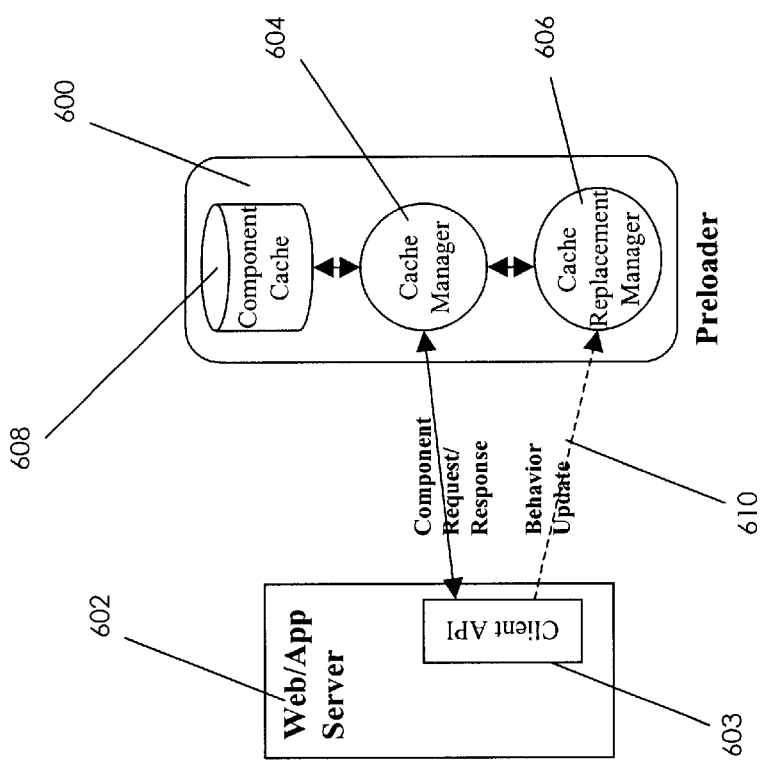
FIG. 6 depicts a preloader that is an exemplary embodiment of the present invention that communicates with a web/app server via an application programming interface.

FIG. 6 depicts a simplified, high-level block diagram of an exemplary Preloader architecture. The Preloader 600 is considered a middle tier caching solution since it resides adjacent to the web/app server 602. The web/app server 602 communicates with the Preloader 600 through a client application programming interface (API) 603. The main components of the Preloader 600 are the Cache Manager 604, Cache Replacement Manager 606, and the Component Cache 608. The Cache Manager 604 handles all requests from the client (i.e., web/app server 602).

There are three types of requests: 1) component retrieval requests, 2) component insertion requests, and 3) component removal requests. The first two types of requests are made by the web/app server 602, while the last type is made by the Cache Replacement Manager 606. A component retrieval request invokes a cache lookup to determine whether the requested component exists in cache. The Cache Manager 604 responds to a component retrieval request with an indication as to whether the component was found in cache and, if found, returns the component. A component insertion request invokes an insertion of a component into the cache. This type of request is made by the web/app server after a cache miss occurs. The Cache Manager responds to a component insertion request with an indication as to whether the component was successfully inserted into the cache.

The Cache Replacement Manager 606 makes replacement decisions in the cache when the cache becomes full. When it is determined that a cache item should be removed, a component removal request is sent to the Cache Manager 604. The dashed line 610 in FIG. 6 between the web/app server 602 and the Cache Replacement Manager 606 indicates the behavior updates that are optionally passed to the Cache Replacement Manager 606. This communication occurs when a predictive cache replacement policy (described in more detail below) is used. The Cache Replacement Manager 606 can utilize any type of cache replacement policy (e.g., LRU), and the best policy to use may be dependent upon the application.

An exemplary embodiment of the present invention utilizes a predictive cache replacement policy that is designed for caching web page components. This predictive cache replacement policy is referred to as the Least-Likely-to-be-Used (LLU) policy. When choosing a replacement "victim" in the cache, it takes into account not only how recently a cached item has been referenced, but also whether any user is likely to need the item in the near future. LLU is described in more detail below. For the purposes of this description, the Preloader architecture is described in connection with the use of LLU replacement.

Referring again to FIG. 4, the LLU Preloader architecture is depicted as a block diagram. The LLU Preloader communicates with a profile server 300 in order to obtain predictive information to use in making cache replacement decisions. More specifically, the Cache Replacement Manager 404, upon receiving a behavior update from the web/app server 302, sends a hint request to the profile server 300. Based on the hint response received (and possibly other information, such as last access time), the Cache Replacement Manager 404 determines which items to remove and sends the corresponding requests to the Cache Manager 406.

Figure 7:
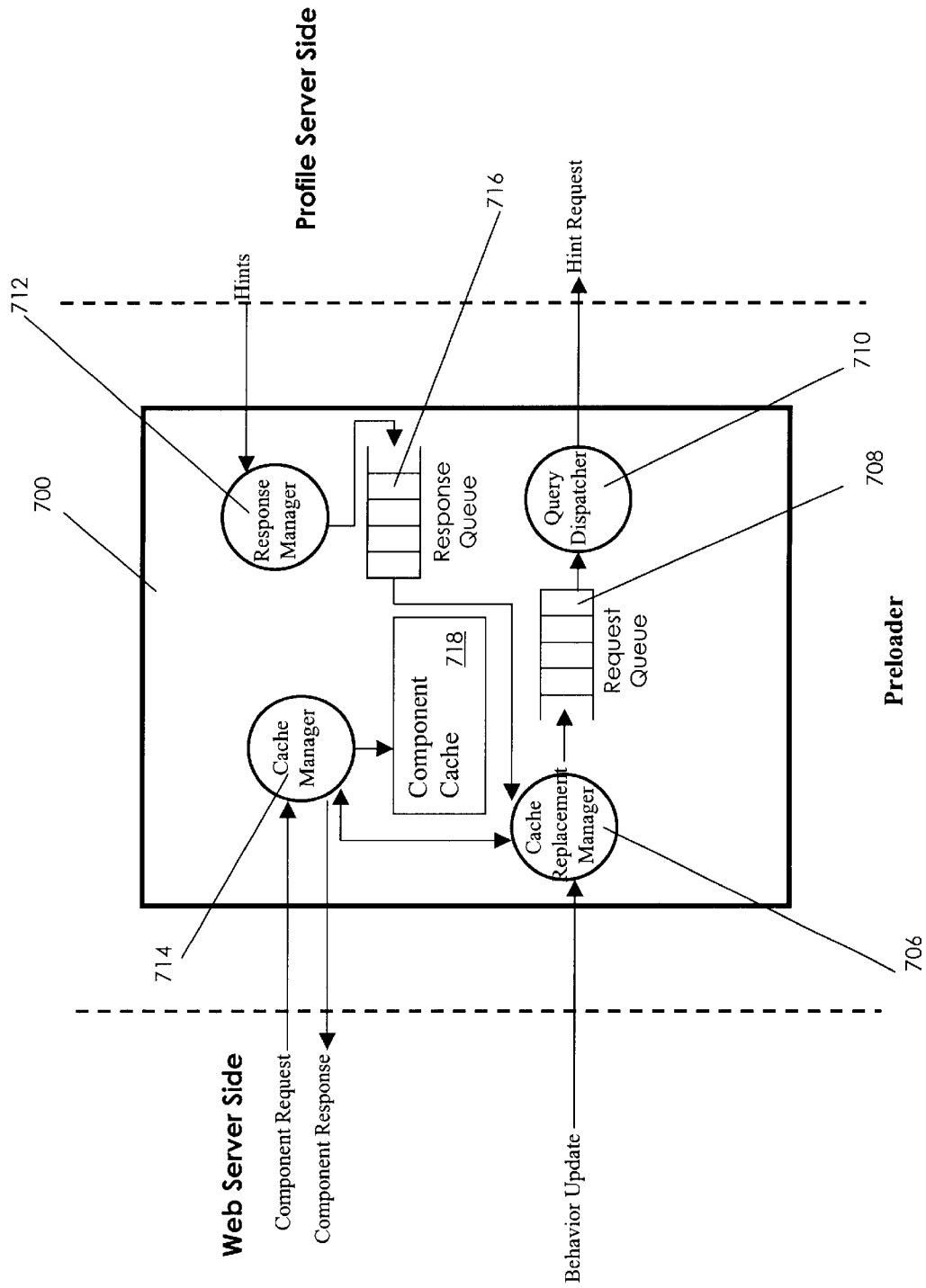
FIG. 7 is a block diagram depicting a Preloader of an exemplary embodiment of the present invention in more detail.

FIG. 7 depicts a block diagram depicting an exemplary LLU Preloader 700 in more detail. The web/app server (not shown) sends a component request to the Cache Manager 714, which is serviced as described above. The Preloader Cache Replacement Manager 706 controls the cache replacement policy. The Cache Replacement Manager 706, upon receiving a behavior update from the web/app server, places a hint request in the Request Queue 708. The Query Dispatcher 710 services requests in the Request Queue 708 in a first-in-first-out (FIFO) order, and thus sends the appropriate request to the Profiler 450 (FIG. 4). The Profiler 450 retrieves the corresponding hints and sends them to the Response Manager 712. The Response Manager 712 places the hints in the Response Queue 716. The Preloader Cache Replacement Manager 706 services hint responses from the Response Queue 716 in FIFO order. The Preloader Cache Replacement Manager 706 utilizes the hints (and possibly other information, such as last access time) to determine which components in the Component Cache 718 to remove. The appropriate removal requests are then sent to the Cache Manager 714.

The Preloader architecture supporting on-demand page generation is shown in FIG. 4, as described above. In this embodiment, the web/app server sends component requests to the Preloader Cache Manager 406. If the requested component is in the Component Cache 402, it is returned to the web/app server. Otherwise, the web/app server executes the script logic necessary to generate the requested component and then writes the component to the Component Cache 402. Based on the component requests received from the web/app server, the Cache Replacement Manager sends hint requests to the Profiler 450 (FIG. 4). The hint responses that are returned from the Profiler 450 are used to make replacement decisions in the cache.

In an exemplary embodiment of the present invention, the Component Cache 402 contains content elements, rather than whole web pages. Essentially, a web page consists of a set of content elements, which are defined by the application (these terms will be formally defined in the next section). By caching at the content element level, the Preloader 400, is able to reuse content elements that are commonly requested, even though other elements on the page may change. For example, the Current Headlines Component in the news site example would be common to all requests for a particular page, whereas the Personalized Component would likely be different for each request and thus should not be cached.

Figure 8:
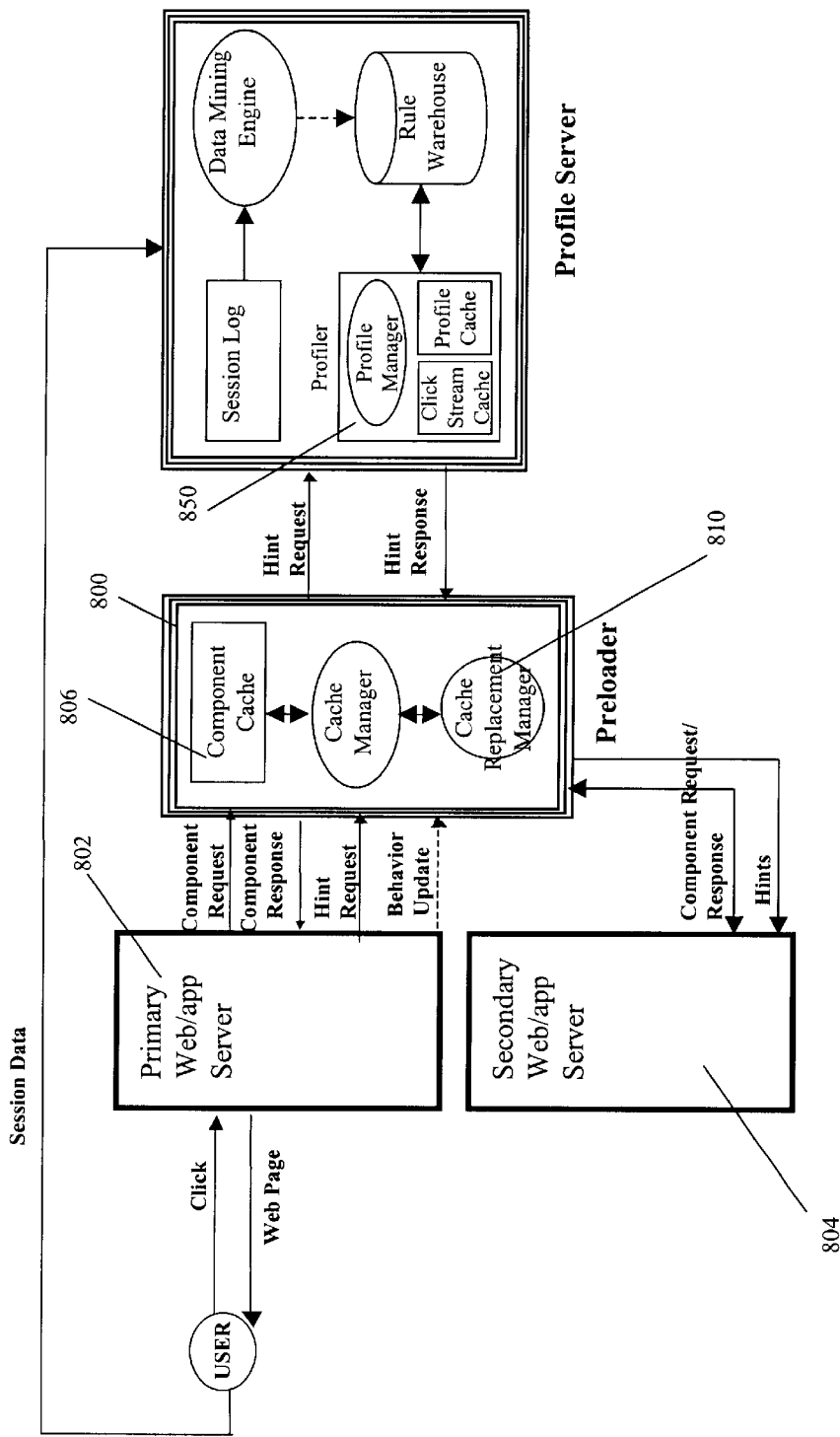
FIG. 8 is a block diagram of an exemplary Preloader that is configured to provide anticipatory page generation.

In an alternative embodiment of the present invention, the Preloader architecture supports both on-demand and anticipatory page generation. FIG. 8 is a block diagram of an exemplary Preloader 800 that is configured to provide anticipatory page generation. The primary difference between this embodiment and the embodiment described in connection with FIG. 4 is that two web/app servers 802, 804 (i.e., more than one web/app server) are used for anticipatory page generation. One web/app server 802 is used to generate pages for the usual on-demand requests described in connection with FIG. 4. A secondary web/app server 804 is used to generate pages for anticipated requests. Thus, as described in connection with FIG. 4, the on-demand portion remains the same. The secondary web/app server 804 is used to generate content in anticipation of future requests.

The Preloader Cache Replacement Manager 810 performs as described above, by requesting hints from the Profiler 850 and using these hints to make replacement decisions in the Component Cache 806. The only additional work required by the Preloader Cache Replacement Manager 810 is that it sends hints to the secondary web/app server 804 so that the secondary web/app server can generate content that may be requested in the near future. The secondary web/app server 804 sends component insertion requests to the Preloader Cache Manager 814, which then updates the cache. Thus, the Component Cache 806 is shared by the primary and secondary web/app servers 802, 804.

An Exemplary Method for Dynamic Web Page Generation

Figure 9:
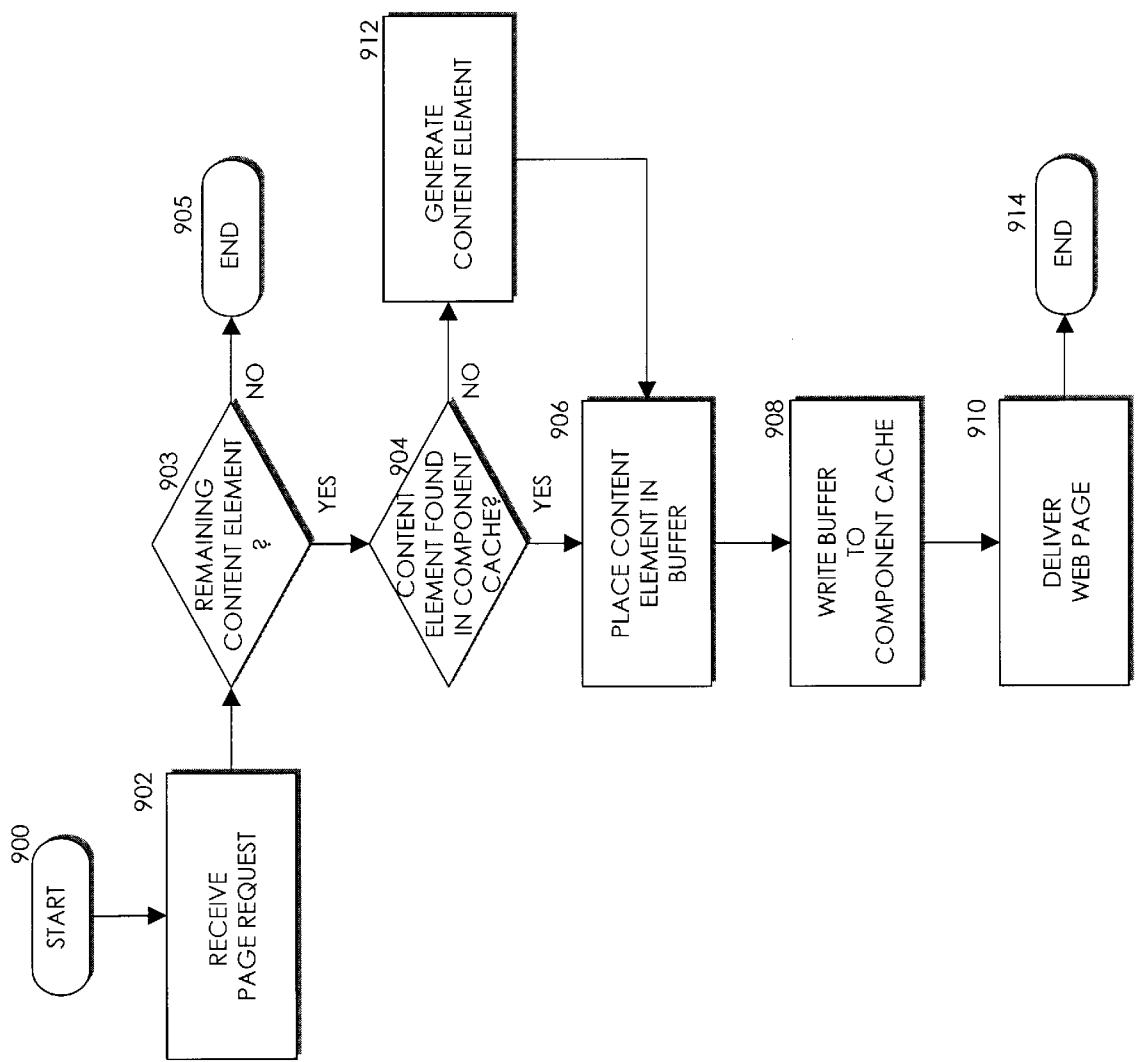
FIG. 9 is a flowchart depicting a method for generating a dynamic web page that is an exemplary embodiment of the present invention.

FIG. 9 is a flowchart depicting a method for generating a dynamic web page that is an exemplary embodiment of the present invention. The method begins at step 900 and proceeds to step 902. At step 902, a page request is received. The method then proceeds to decision block 903. At decision block 903, a determination is made as to whether the page request has any remaining content elements that have not been supplied. If no content elements remain unsupplied, then the method proceeds to step 905 and ends.

If, at decision block 903, a determination is made that at least one content element remains unsupplied, then the method branches to decision block 904. At decision block 904, a determination is made as to whether the remaining content element is found in a component cache. If the content element is not found in the component cache, then the method branches to step 912 and the content element is generated. In one embodiment of the present invention the generation of content elements can be handled by the web/app server. The method then proceeds to step 906. If, on the other hand, the content element is found in the cache, then the method branches from decision block 904 to step 906. At step 906, the content element is placed in a buffer.

The method proceeds from step 906 to step 908 and the buffer elements that were not found in cache are written to the component cache. The method then proceeds to step 910 and the web page is delivered. The method then proceeds to step 914 and ends. Notably, the same method can be applied whether providing web pages on an on-demand basis or on an anticipatory basis. The difference is that the page requests in the anticipatory page generation context will include requests for pages that have not actually been requested by the user, but are expected to be requested by the user. When utilized in the context of the Preloader of FIG. 7, the method for web page generation processes each content element in a web page. It first checks the Component Cache 718 to determine whether the component exists in the cache. Details of how the cache is structured and accessed will be discussed in more detail below, in connection with FIGS. 8–10. In the case of a component hit (content element found in Component Cache 718), the component is simply placed in the buffer. In the case of a component miss (content element not found in Component Cache 718), the component is generated according to the conventional script logic, and then placed in the buffer (not shown). Content elements can be stored in any format. After all content elements have been processed according to this exemplary method, any additional logic required by the server is executed. Next, the buffer elements that were not found in cache are written to the Component Cache 718, and the web page is returned to the requesting user. Because the Preloader Cache Manager and the Preloader Cache Replacement Manager play such important roles in both embodiments, a more detailed discussion of each follows.

An Exemplary Preloader Cache Manager

The exemplary Cache Manager handles all requests from the client (i.e., web/app server). In one embodiment of the present invention, there are three types of requests: 1) component retrieval requests, 2) component insertion requests, and 3) component removal requests. The first two types of requests are made by the web/app server, while the last type is made by the Cache Replacement Manager. A component retrieval request invokes a cache lookup to determine whether the requested component exists in the Component Cache. The Cache Manager responds to a component retrieval request with an indication as to whether the component was found in cache and, if found, returns the component. A component insertion request invokes an insertion of a component into the cache. This type of request is made by the web/app server after a cache miss occurs. The Cache Manager responds to a component insertion request with an indication as to whether the component was successfully inserted into the cache. A component removal request is sent to the Cache Manager by the Cache Replacement Manager when it is determined that a cache item should be removed. The decision to remove a component is made by the Cache Replacement Manager, based upon a cache replacement policy. The Cache Replacement Manager, along with the LLU cache replacement policy, is described below.

An Exemplary Preloader Cache Replacement Manager

In an exemplary embodiment of the present invention, the Preloader Cache Replacement Manager controls the replacement policy of the Component Cache. The present invention uses a novel combination of the Preloader Cache Replacement Manager, the Component Cache structure, the cache states, and a replacement policy to generate on-demand and anticipatory web pages.

Figure 10:
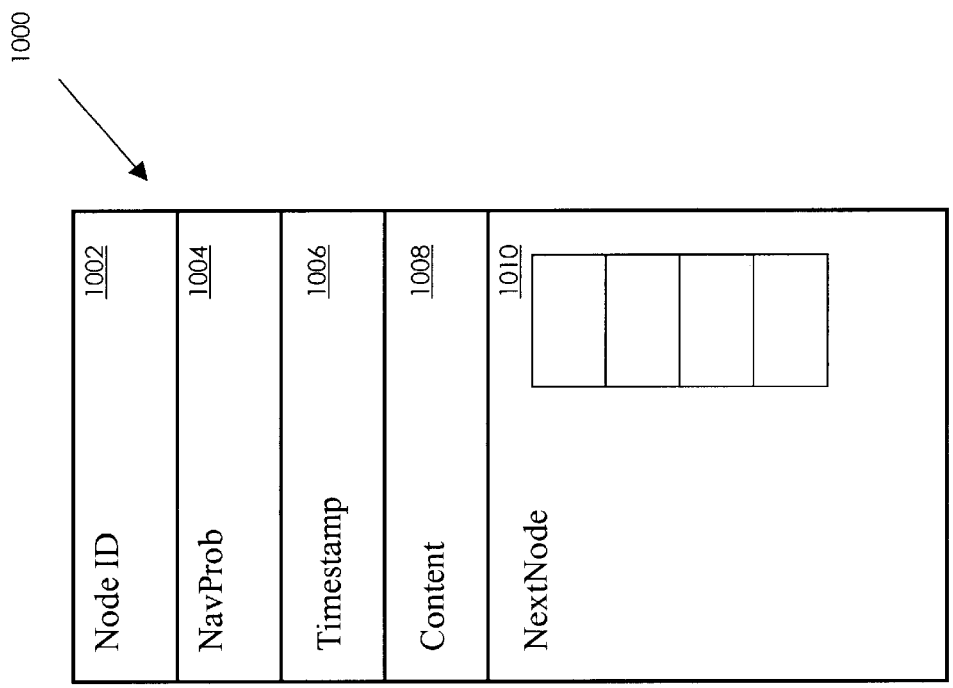
FIG. 10 is a block diagram depicting an exemplary Content Element Node.

The Component Cache consists of a configurable number of elements, called cachelines. Each cacheline can store at most one instance of a Content Element Node. FIG. 10 is a block diagram depicting an exemplary Content Element Node 1000. The Content Element Node 1000 contains at least the following data components: 1) a NodeID 1002, which uniquely identifies each content element in the cache and maps each content element to a unique combination of Page or Script ID and Code Block ID; 2) a NavProb 1004, which is the conditional probability that a user will request the current content element, given that he has followed a path of length CSL up to the user's present clickstream position; 3) a Timestamp 1006, which indicates the time that the element was last accessed; 4) a Content component 1008, which holds the data for the content element in HTML format (or other formats); and 5) a NextNode 1010, which is an array structure containing NodeIDs for all nodes that are reachable, in a single step, from the current node.

The Component Cache is initially empty. A content element is added to the cache after it is requested. The Component Cache is not kept completely full, additional space is maintained so that content elements can be written to the Component Cache as soon as they are requested. Replacement decisions are then made based on the navigation probabilities and timestamps.

Cachelines have two possible states: empty and full. A cacheline is said to be in the empty state when the cacheline contains no Content Element Node. All cachelines are empty at system startup. A cacheline returns to this state when is has been selected for replacement, before a new Content Element Node has been stored in it. A cacheline enters, the full state when a content miss occurs. A component miss triggerrs the web/app server to send a component insertion request to write the requested content element to the Component Cache. This step instantiates the fields in the Content Element Node. Specifically, NodeID 1002 is set to the combination of PageID and Code Block ID for the requested content element, Timestamp 1006 is set to the current time, NavProb 1004 is computed (as is described in more detail below), and the HTML corresponding to the content element is placed in Content 1008. A cacheline remains in the full state until it is selected for replacement.

To compute a navigation probability, the navigation probability for a cacheline must first be defined. For two cachelines $CL_i$ and $CL_j$, there are associated Content Element Nodes CENI and CENJ, respectively. The navigation probability from $CL_i$ to $CL_j$ is denoted by $NP(CL_i \rightarrow CL_j)$, and represents the conditional probability that a user will request the content element contained in $CL_j$, given that he has followed a path of length CSL up to this point.

For a set of cachelines, $\{CL_1, CL_2, \ldots, CL_n\}$, maximum navigation probability (MNP) of a cacheline, $CL_i$, is denoted by $MNP(CL_i)$ and is given by:

$$MNP(CL_i) = \max[NP(CL_1 \rightarrow CL_i), NP(CL_2 \rightarrow CL_i), \ldots, NP(CL_n \rightarrow CL_i)]$$

For a given cacheline, $CL_j$, having n predecessors, $NP(CL_i \rightarrow CL_j)$ is computed in each of three different scenarios as follows: 1) if the cacheline has no predecessors (i.e., n=0), then $CL_j=1$; 2) if the cacheline has a single predecessor (i.e., n=1), then $CL_j$ is the navigation probability obtained from the Profiler; 3) if the cacheline has multiple predecessors (i.e., n>1), then $CL_j = MNP(CL_j)$.

Figure 11:
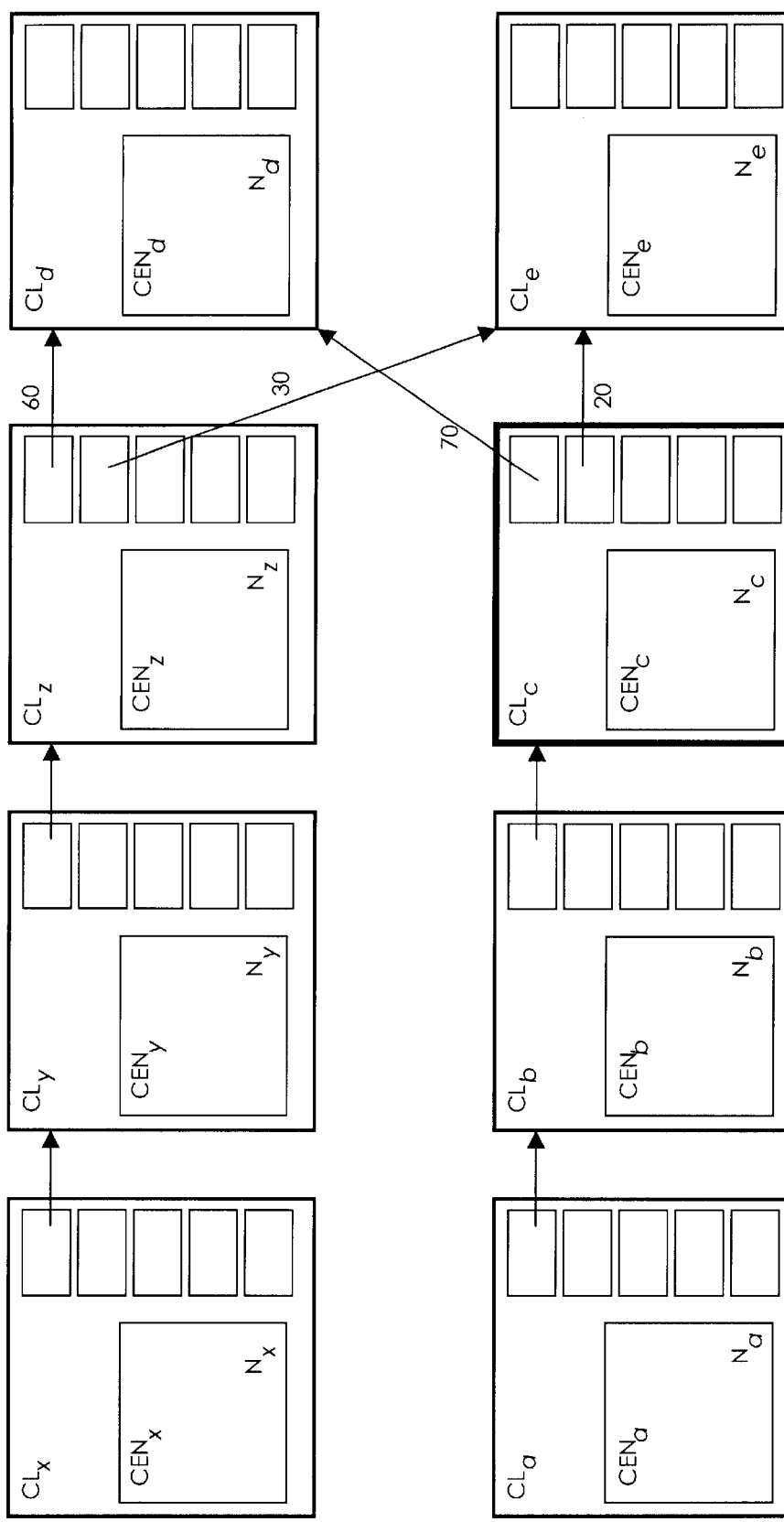
FIG. 11 is a block diagram depicting an exemplary Component Cache containing a set of Content Element Nodes.

FIG. 11 is a block diagram depicting an exemplary Component Cache containing a set of Content Element Nodes. In the case where the Component Cache contains the Content Element Nodes shown in FIG. 11, it is assumed that the lookahead distance (LD) is 1 and CSL is 3. Each Content Element Node actually contains all the information described previously, but only NodeIDs are depicted in FIG. 11. If the content element corresponding to node N, was most recently requested (as indicated by the bold outline of the cacheline), then the navigation probabilities are shown on the arrows. For example, the navigation probability for navigating from $CL_z$ to $CL_d$ is 60%, and the navigation probability for navigating from $CL_z$ to $CL_e$ is 30%.

Figure 12:
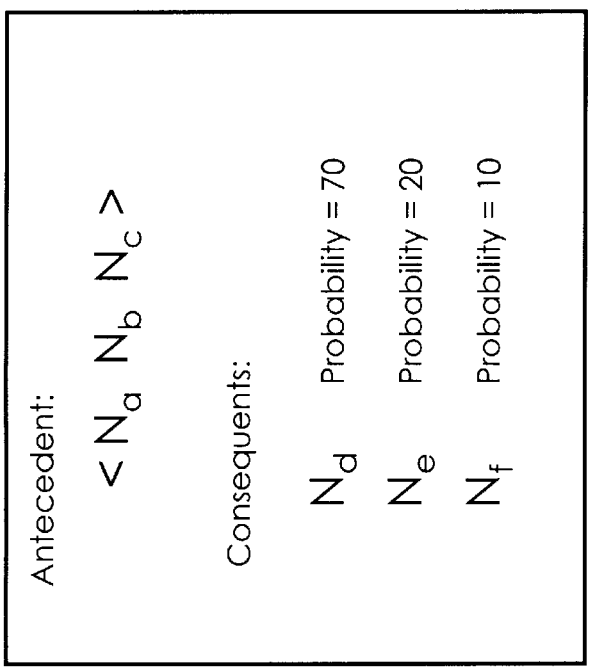
FIG. 12 is a block diagram depicting an exemplary hint.

FIG. 12 is a block diagram depicting an exemplary hint 1200. Assuming that the Profiler has returned the hint 1200 (i.e., profile), then the profile indicates that there is a 70% probability that the user will request $N_d$, given that the user has most recently requested $<N_a, N_b, N_c>$. Likewise, there is a 20% probability that the user will request $N_e$ and a 10% probability that the user will request $N_f$. These probabilities correspond with the arrows discussed in connection with FIG. 11. There is no cacheline for $N_f$ in FIG. 11, because this content element is not currently in the Component Cache. To update the probabilities for $CL_d$ and $CL_e$, the MNP is determined for each. Thus, $MNP(CL_d) = \max(\mathbf{70}, \mathbf{60}) = 70$ and $MNP(CL_e) = \max(\mathbf{30}, \mathbf{20}) = 30$. These values are then stored in the NavProb field in the corresponding cachelines. Note that other methods besides MNP may be used to compute NavProb. For instance, one could compute NavProb as the probability that any visitor will request a particular content element and thus take the union of all predecessor's probabilities.

The navigation probabilities are updated with every user request or click. The MNP is computed online for a cacheline by broadcasting a user's position to each cacheline that is within a configurable maximum lookahead distance (MLD) ahead of the user's current cacheline. Specifically, with each user click, the Preloader Cache Manager updates the NavProb for each cacheline within MLD ahead of the current cacheline, where MLD is a configurable parameter.

Cachelines in the cache are replaced based on two criteria: navigation probability and timestamp. For both criteria, configurable threshold values can be set to determine which cachelines to remove. For navigation probability, the minimum navigation probability threshold, $NP_{min}$, is used for this purpose. Any cacheline having a navigation probability less than $NP_{min}$ is removed from the cache. In order to avoid the possibility that cachelines may sit unused for a long time in the cache, we use a threshold value, $T_{max}$, to remove cachelines from the cache. Recall that each cacheline contains a timestamp indicating the most recent access time of the cacheline. The timestamp of each cacheline is compared to $T_{max}$, and those cachelines having timestamps greater than $T_{max}$ are removed. Note that various combinations of the navigation probability and timestamp policies may also be used.

Improved Web Page Delivery Performance

Figure 13:
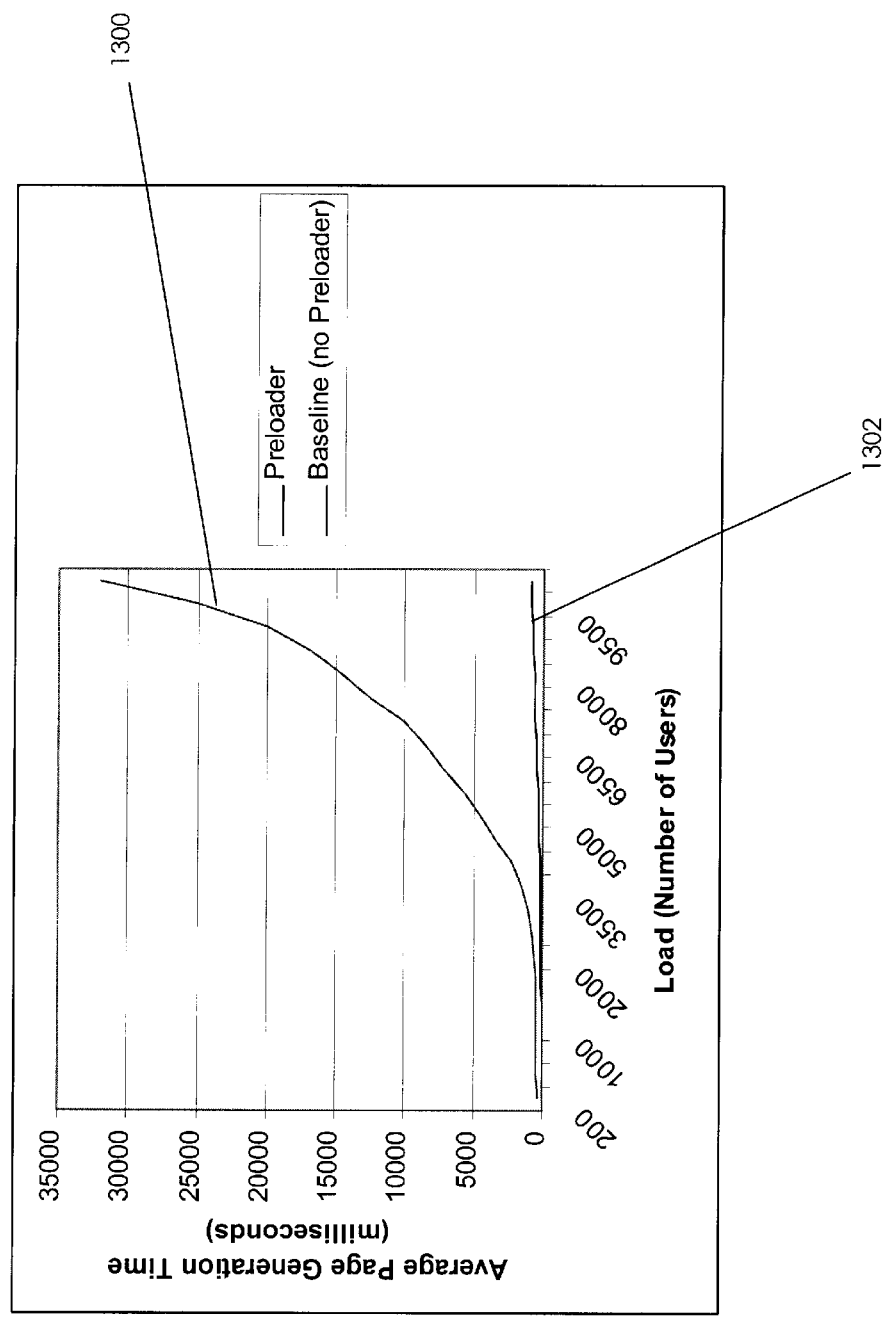
FIG. 13 depicts a graph of the performance of a simulated catalog-based web site that dynamically generates catalog pages using an exemplary embodiment of the present invention.

FIG. 13 depicts a graph of the performance of a simulated catalog-based web site that dynamically generates catalog pages using an exemplary embodiment of the present invention. The test environment simulates an e-commerce site having a product catalog which contains approximately 600 products. The site is servlet-based, running WebLogic 5.1 as the application server and using an Oracle 8.1.5 database to store the product catalog data. To introduce user load at the site, a number of simulated users are created that navigate the site, requesting various pages in the catalog. Each user request submits a set of queries to the underlying database to construct the requested catalog page. The page generation time, the time to construct a complete HTML page, is recorded for each request.

The test configuration consists of two clusters of machines, a cluster of servers and a cluster of clients. Each machine is a Dell Optiplex GX 110 having 512 MB RAM and a Pentium III 600 Mhz processor. There are four servers in the server cluster, each running WebLogic on an NT Server 4.0 SP 5 platform and communicating with its own Oracle database instance. There are eight clients in the client cluster, each running a web server that sends requests to the server cluster. Two sets of experiments were run, one using a database connection pool size of 20 and the other a connection pool size of 50. The database connection pool size is the maximum number of open connections to the database. Thus, in general, the higher this number, the better the performance. For each experiment, the number of users was varied to show scalability. To simulate user load, each user clicks at a rate of one click every 10 seconds.

Results for the connection pool size of 20 are shown in FIG. 13. The horizontal axis shows the number of users, while the vertical axis shows the average page generation time in milliseconds. In the case where no caching is employed, the uppermost curve 1300, the page generation time increases dramatically once the load increases beyond 1000 users. This spike is due to the inability of the underlying database system to keep up with the incoming requests.

Where an exemplary Preloader has been used, the lowermost curve 1302, exhibits a very flat shape due to its ability to retrieve much of the requested content from cache. Thus, the load on the underlying database is substantially reduced in this case. In terms of the magnitude of the performance differential, the Preloader is more than 6 times faster than the non-cache case for smaller loads (200 users), more than 20 times faster for moderate loads (3500 users), and more than 46 times faster for larger loads (7500 users).

Although the present invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A web page delivery system for dynamically generating a web page having at least one content element, the delivery system comprising:

a web/app server operative to receive a web page request from a user to generate a web page and to deliver the web page to the user, said web/app server further operable to generate a hint request;

a preloader operative to receive a content element retrieval request from the web/app server and to deliver the at least one content element to the web/app server, wherein the preloader is in communication with the web/app server, and wherein the preloader comprises a component cache, local to the web/app server, for maintaining the at least one content element; and a profile server operative to receive the hint request from the preloader and to deliver a hint to the preloader;

wherein the preloader delivers the at least one content element to the web/app server in response to a determination that the hint indicates that the at least one content element will be needed by the web/app server to generate the web page, and wherein the at least one content element is provided by the component cache local to the web/app server to reduce the time required to generate the web page.

2. The web page delivery system of claim 1, wherein the preloader is further operative to receive a content element insertion request from the web/app server and to service the request, in response to receiving the content element insertion request.

3. The web page delivery system of claim 1, wherein the preloader further comprises a cache manager operative to receive the content element retrieval request and the content element insertion request and to determine whether the at least one content element resides in the component cache.

4. The web page delivery system of claim 3 further comprising a secondary web/app server that is operative to send component insertion requests to the cache manager.

5. The web page delivery system of claim 1, wherein the preloader further comprises a cache replacement manager operative to control a replacement policy of the component cache.

6. A method for delivering a web page, the method comprising the steps of:

receiving a web page request, the web page request corresponding to a web page having at least one requested content element;

determining whether a tagged content element resides in a component cache, the tagged content element corresponding to the at least one requested content element;

generating a content response for each web page request, wherein the content response includes the tagged content element if the tagged content element resides in the component cache;

generating the requested content element if the tagged content element does nto reside in the component cache;

generating a hint request;

storing a content element node in the component cache, in response to a determination that the tagged content element does not reside in the component cache, the content element node corresponding to the generated content element;

delivering at least one other content element in response to the determination that the hint request that the at least one other content element is needed to generate the web page; and delivering the web page comprising the at least one requested content element and the at least one other content element.

7. The method of claim 6, further comprising the step of generating a hint request associated with the content element node, the hint request comprising the likelihood that the requested content element will be needed by a future web page request.

8. The method of claim 7, further comprising the steps of receiving a hint response associated with the hint request, in response to the generation of the hint request; and making a cache replacement decision, in response to receiving the hint response.

9. The method of claim 8, wherein the cache replacement decision indicates whether the requested content element should be maintained in the component cache.

10. The method of claim 6, wherein the content response comprises an indication as to whether the tagged content element resides in the component cache.

* * * * *